US011125853B2

(12) United States Patent
Phillips et al.

(10) Patent No.: US 11,125,853 B2
(45) Date of Patent: Sep. 21, 2021

(54) SYSTEM AND METHOD FOR DETERMINING POSITION OF A RECEIVER RELATIVE TO A TRANSMITTER

(71) Applicant: ANDRA MOTION TECHNOLOGIES INC., Dartmouth (CA)

(72) Inventors: Kenzie Phillips, Brookside (CA); Jamie Ryan Mascola, Dartmouth (CA); Julian Taylor, Halifax (CA); Jeff Levy, Hammonds Plains (CA)

(73) Assignee: Andra Motion Technologies Inc., Dartmouth (CA)

( * ) Notice: Subject to any disclaimer, the term of this patent is extended or adjusted under 35 U.S.C. 154(b) by 134 days.

(21) Appl. No.: 16/324,480

(22) PCT Filed: Aug. 10, 2017

(86) PCT No.: PCT/CA2017/050945
§ 371 (c)(1),
(2) Date: Feb. 8, 2019

(87) PCT Pub. No.: WO2018/027319
PCT Pub. Date: Feb. 15, 2018

(65) Prior Publication Data
US 2019/0170854 A1 Jun. 6, 2019

Related U.S. Application Data

(60) Provisional application No. 62/373,065, filed on Aug. 10, 2016.

(51) Int. Cl.
*G01S 5/16* (2006.01)
*G01S 1/70* (2006.01)
(Continued)

(52) U.S. Cl.
CPC ............... *G01S 5/16* (2013.01); *G01S 1/042* (2013.01); *G01S 1/08* (2013.01); *G01S 1/7038* (2019.08); *G01S 5/02* (2013.01)

(58) Field of Classification Search
CPC . G01S 5/16; G01S 1/7038; G01S 5/02; G01S 1/042; G01S 1/08; G01S 1/70
See application file for complete search history.

(56) References Cited

U.S. PATENT DOCUMENTS

| 4,737,794 A | 4/1988 | Jones |
| 5,453,686 A | 9/1995 | Anderson |

(Continued)

OTHER PUBLICATIONS

Raab, Frederick H. et al., "Magnetic Position and Orientation Tracking System", Sep. 1979, IEEE Transactions on Aerospace and Electronic Systems, vol. AES-15, Issue 5, pp. 709-718.

(Continued)

*Primary Examiner* — Lee E Rodak
(74) *Attorney, Agent, or Firm* — Conley Rose, P.C.

(57) ABSTRACT

A method and system for determining a position and orientation of a receiver relative to a transmitter includes transmitted positioning signals having different frequency components that define a common period. One or more of the transmitted positioning signal have identifiable phase characteristics relative to the start of the common period. The positioning signals are received at the receiver. A time point corresponding to the start of the common period is determined from the received positioning signals. The polarities of the received signals can then be determined based on properties of the positioning signals relative to the start of the common period and relative to properties of the transmitted positioning signals. These polarities can be used to track a signed position and uniquely associated orientation of the receiver relative to the transmitter.

26 Claims, 18 Drawing Sheets

(51) Int. Cl.
  *G01S 5/02*  (2010.01)
  *G01S 1/04*  (2006.01)
  *G01S 1/08*  (2006.01)

(56) References Cited

U.S. PATENT DOCUMENTS

| | | |
|---|---|---|
| 7,761,100 B2 | 7/2010 | Anderson |
| 2007/0152131 A1 | 7/2007 | Pihlaja |
| 2009/0030646 A1* | 1/2009 | Jones .................... A61B 34/20 |
| | | 702/150 |
| 2009/0076746 A1* | 3/2009 | Higgins .................. A61B 5/06 |
| | | 702/57 |
| 2014/0087757 A1* | 3/2014 | Reimann ................ G01S 11/10 |
| | | 455/456.1 |
| 2014/0320335 A1* | 10/2014 | Lee ....................... G01S 13/588 |
| | | 342/107 |
| 2016/0282446 A1* | 9/2016 | Kenders ................... G01S 5/04 |

OTHER PUBLICATIONS

International Search Report for PCT/CA2017/050945, dated Nov. 6, 2017, 3 pages.
International Preliminary Report on Patentability for PCT/CA2017/050945, dated Feb. 12, 2019, 4 pages.

* cited by examiner

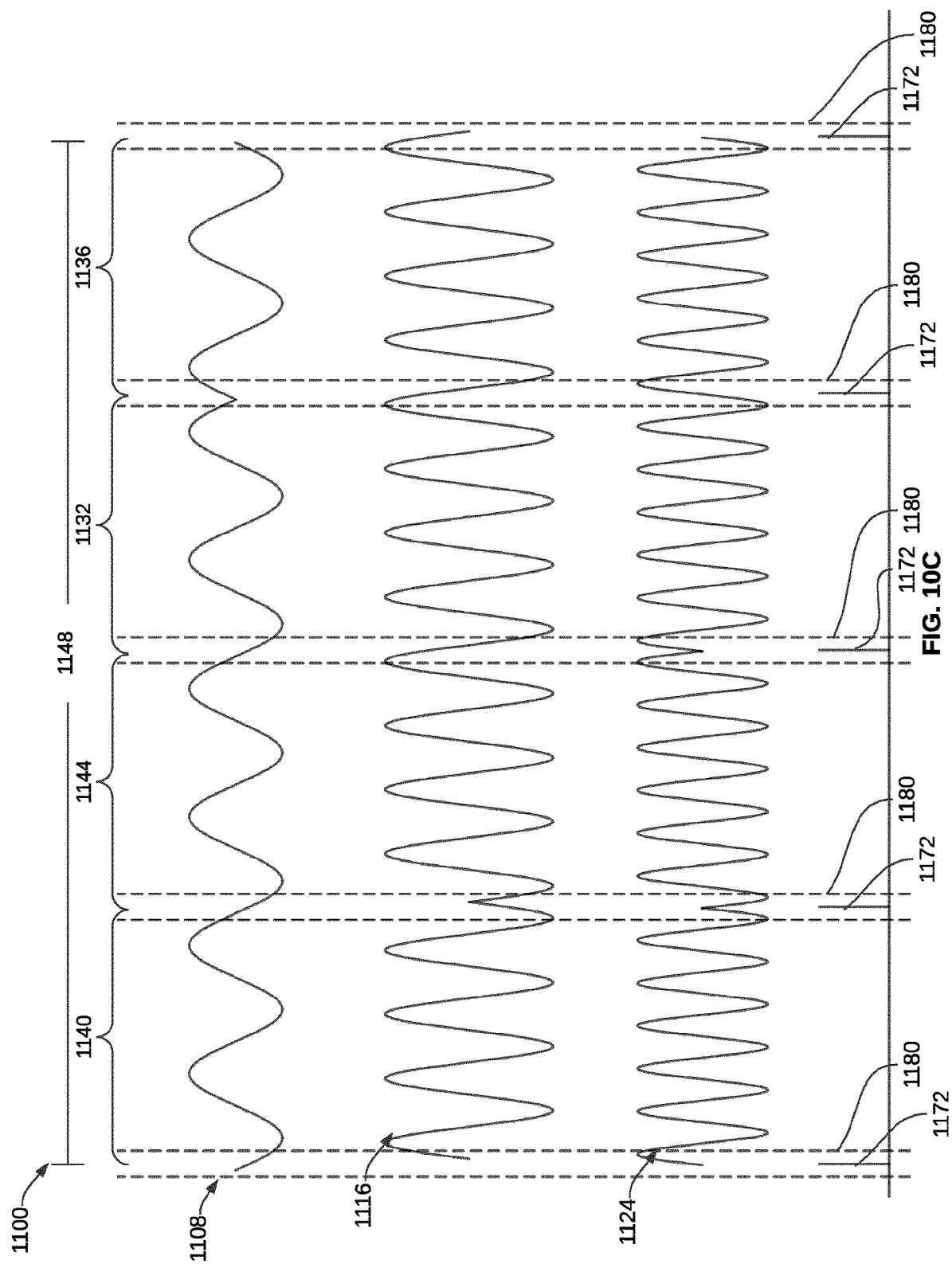

SYSTEM AND METHOD FOR DETERMINING POSITION OF A RECEIVER RELATIVE TO A TRANSMITTER

RELATED PATENT APPLICATION

The present application is a National Phase Entry of, and claims priority to, PCT Application No. PCT/CA2017/050945, filed Aug. 10, 2017, which claims priority from U.S. provisional patent application No. 62/373,065, filed Aug. 10, 2016 and entitled "METHODS FOR CORRELATING THE PHASE ANGLE OF A MULTIPHASE AC MAGNETIC FIELD BETWEEN A TRANSMITTER AND RECEIVER", the entire contents of each being hereby incorporated by reference in their entirety for all purposes.

TECHNICAL FIELD

The technical field generally relates to systems and methods for tracking position and orientation of a receiver within a three-dimensional space relative to a transmitter. More particularly, the systems and methods use transmission and receiving of magnetic field positioning signals for positioning and orientation tracking.

BACKGROUND

Common methods for positioning and orientation tracking correlate the position and orientation of a transmitter and a receiver in terms of their mutual distance orientation with respect to each other.

For example, alternating current (AC) magnetic tracking systems have been implemented since the 1970s. The typical system uses a transmitter that emits a plurality of AC magnetic field signals having distinct, and possibly harmonically related, field frequencies. As well, these fields are aligned in such a way as to give a fixed, though not necessarily orthogonal propagation through free space. The magnetic field signals being transmitted into a three-dimensional space can be sensed by a receiver. Positioning (distance and orientation) of the receiver relative to the transmitter can be determined based on properties (ex: amplitude) of the received magnetic field signals.

A receiver typically contains one or more magnetic field sensing elements, e.g. inductive coils/antennae, Hall-Effect Sensors, or AMR sensor, etc. These are aligned to fixed magnetic flux detection positions in three-dimensional space. The sensing elements can be oriented orthogonally with respect to one another. The sensing elements can also be co-located (ex: located in the same location, such as being concentric). However, other receivers can use non-concentric designs or use a plurality of sensing elements in various ways. In many cases, the sensing elements are arranged in an axis-symmetric pattern that related to the properties of the positioning magnetic fields transmitted by the transmitter.

U.S. Pat. No. 4,737,794 describes an example of a design for the receiver and the transmitter. U.S. Pat. No. 5,453,686 describes an example of another design for the receiver and the transmitter.

In such prior art systems, when a sensing element of the receiver encounters the flux field lines of the positioning signals transmitted from the transmitter's coils, a voltage signal is induced at the sensing element. The voltage signal has a waveform that is related to one or more of the positioning signals transmitted from the transmitter.

The received voltage signal induced at each sensing element can be conditioned. Conditioning may include any number of analog or digital techniques known in the art. Conditioning the received signal improves its overall signal quality and/or fidelity, such as from reducing noise, increasing amplitude, etc.

Each signal can then be segregated by frequency to determine its properties by frequency. Techniques that are well known in the art can be used, such as Fourier transform (ex: DFT, FFT), cosine transform, band-pass filter, etc.). The amplitudes and phase angle of these frequency components of each received voltage signal can then be computed and used to determine the distance and orientation of the receiver relative to the transmitter.

Techniques for determining the distance and orientation of the receiver relative to the transmitter known in the art generally vary between iterative and deterministic techniques. "Magnetic Position and Orientation Tracking System", Raab, IEEE Explore, 1979, provides an example of an iterative method. U.S. Pat. No. 4,737,794 provides a deterministic method. The techniques can also be combined. The result of these techniques is an indication of the position (distance) and orientation of the receiver in relation to the transmitter. Although the initial computation of the position and the orientation may be either mutual or sequential, the two measurements are typically often intertwined.

SUMMARY OF THE DISCLOSURE

According to one aspect, there is provided a method of determining a position of a receiver relative to a transmitter includes transmitting from the transmitter a first transmitted positioning signal having a first frequency and phase in a first direction, transmitting from the transmitter a second transmitted positioning signal having a second frequency and phase in a second direction, the second frequency being different from the first frequency, transmitting from the transmitter a third transmitted positioning signal having a third frequency and phase in a third direction, the third frequency being different from the first frequency and the second frequency, the first positioning signal, the second positioning signal and the third positioning signal defining a common period being a common multiple of the periods of the first, second, and third positioning signals, receiving, at the receiver, a first received positioning signal corresponding to the transmitted first positioning signal, receiving, at the receiver, a second received positioning signal corresponding to the transmitted second positioning signal, receiving, at the receiver, a third received positioning signal corresponding to the transmitted third positioning signal, determining for the first, second and third received positioning signals a time point corresponding to the start of the common period defined by the first, second, and third received positioning signals and determining a polarity of the first received positioning signal, a polarity of the second received positioning signal, and a polarity of the third received positioning signal based on properties of the first, second and third received positioning signals relative to the start of the common period and relative to properties of the first, second and third transmitted positioning signals.

According to another aspect, there is provided a positioning system including a transmitter and a receiver. The transmitter is configured for transmitting a first transmitted positioning signal having a first frequency and phase in a first direction, transmitting a second transmitted positioning signal having a second frequency and phase in a second direction, the second frequency being different from the first frequency, transmitting a third transmitted positioning signal having a third frequency and phase in a third direction, the third frequency being different from the first frequency and the second frequency, the first positioning signal, the second positioning signal and the third positioning signal defining a common period being a common multiple of the periods of the first, second, and third positioning signals. The receiver is configured for receiving a first received positioning signal corresponding to the transmitted first positioning signal, receiving a second received positioning signal corresponding to the transmitted second positioning signal, and receiving a third received positioning signal corresponding to the transmitted third positioning signal, determining for the first, second and third received positioning signals a time point corresponding to the start of the common period defined by the first, second, and third received positioning signals, and determining a polarity of the first received positioning signal, a polarity of the second received positioning signal, and a polarity of the third received positioning signal based on properties of the first, second and third received positioning signals relative to the start of the common period and relative to properties of the first, second and third transmitted positioning signals.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 10C illustrates a graph showing waveform representations of three received positioning signals in combination with a beacon signal.

Figure 1:
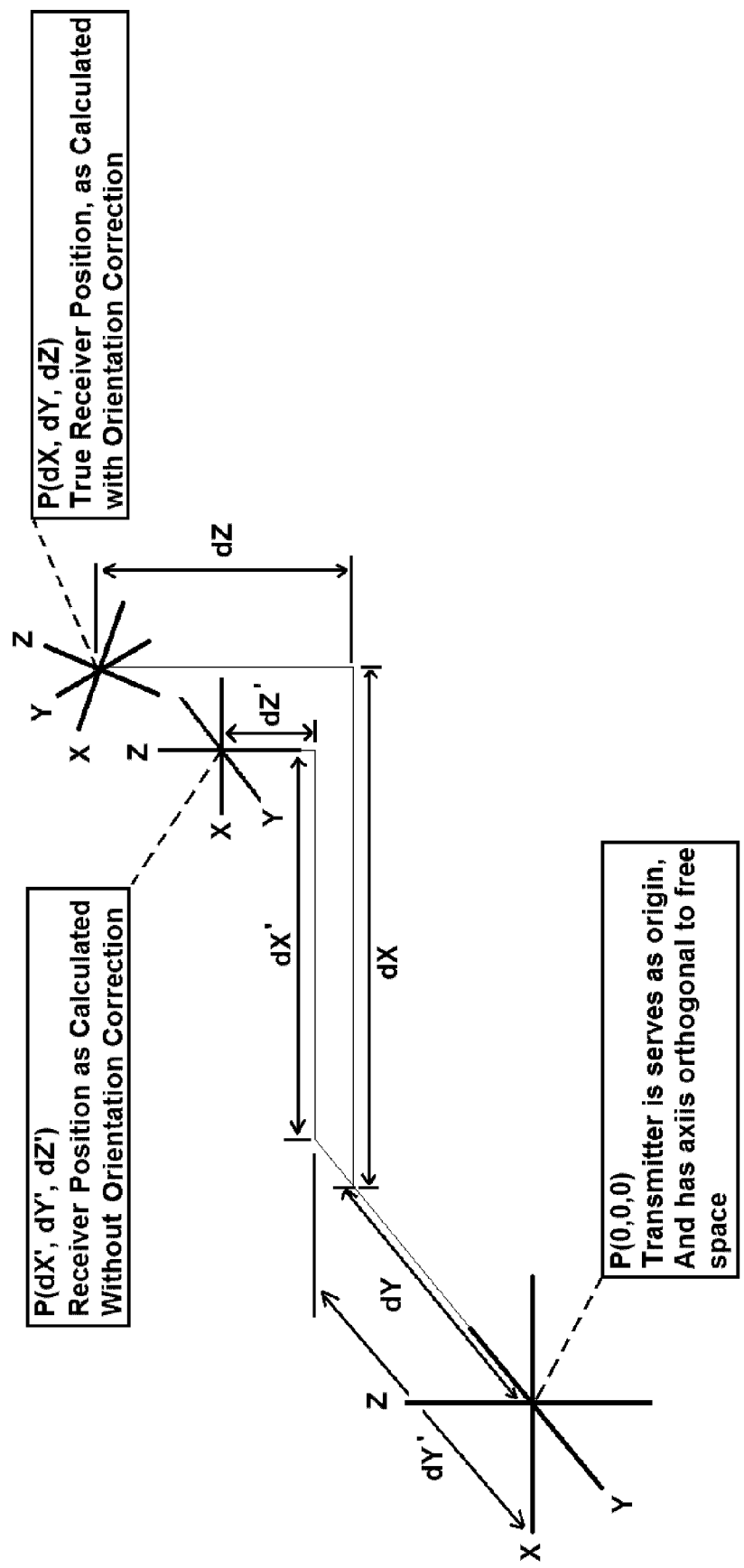
FIG. 1 illustrates a typical arrangement of a position tracking system having a transmitter and a receiver.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF THE DISCLOSED EXEMPLARY EMBODIMENTS

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Referring now to FIG. 1, therein illustrated is a schematic diagram of a typical arrangement of a position tracking system having a transmitter and a receiver. The transmitter is positioned within a three-dimensional space where positioning tracking is to be carried out. The location transmitter can be defined as the origin and a coordinate space (ex: mutually orthogonal X-axis, Y-axis and Z-axis) can also be defined.

Magnetic field positioning signals are transmitted from the transmitter. For three-dimensional tracking, at least three distinct positioning signals are transmitted. A first positioning signal is transmitted from a first location and in a first direction. A second positioning signal is transmitted from a second location and in a second direction. A third positioning signal is transmitted from a third location and in a third direction. Each of the positioning signals can be distinguished from any of the other two positioning signals based on a property other than amplitude or phase. For example, each of the positioning signals has a distinctive frequency response.

The positioning signals can be transmitted along each of the axes and can be orthogonal. However, it will be understood that the positioning signals do not need to be mutually orthogonal. Similarly, the transmitting elements radiating the positioning signals do not need to be co-located.

The receiver is also located within the three-dimensional space and receives the three positioning signals transmitted from the transmitter. The receiver distinguishes the three positioning signals based on their distinguishing property, such as their respective frequency responses.

The amplitude and direction for a given positioning signal received at the receiver relative to the amplitude and direction of the corresponding positioning signal when transmitted from the transmitter provides an indication of the distance traveled by that signal, the angle deviation from the axis of the transmitter, and the rotation of the receiving elements relative to the transmitter. The amplitudes of each of the positioning signals can be combined to determine a rough unsigned position of the object (ex: as defined by dX', dY' and dZ' in FIG. 1). Furthermore, the direction of the three position signals as received by the sensor (and relative to its local coordinate system), compared to the known direction of the positioning signals at the position in space relative to the transmitters coordinate system can be used to determine orientation. Since the amplitude is affected by the coupling angle of the receiver's receiving elements with the corresponding transmitter elements of the transmitter, the amplitudes and the direction of the position signals are related. Orientation correction, as is known in the art, can be applied to determine a corrected position and orientation of the receiver. Other calculation/correction techniques may also be applied, such as to account for the transmitted positioning signals not being mutually orthogonal and/or the signals being transmitted from different locations and/or to account for distorted magnetic fields.

It was observed that an issue arises with regard to determining the sign of the received positioning signals. This issue arises because the polarity of the positioning signals must be determined at the receiver in order to determine the signed position and its uniquely associated orientation. Otherwise, an ambiguity exists as to the sign of the positioning signals, and thereby also ambiguity as to the signed position and correct orientation of the receiver relative to the transmitter.

Figure 2:
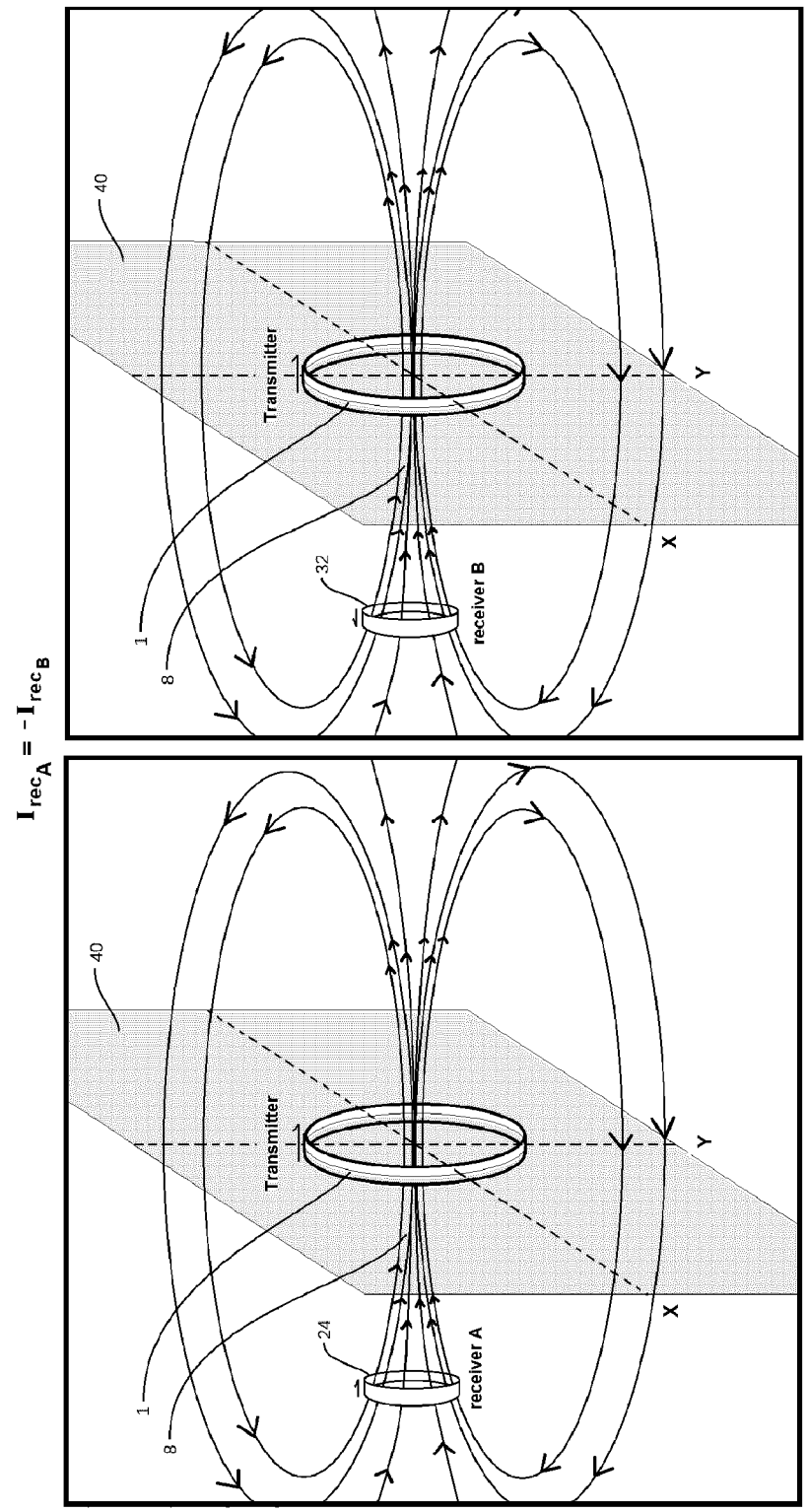
FIG. 2 illustrates the flux lines of a magnetic field emitted from a transmitter and the presence of an ambiguity regarding the absolute sign of an AC magnetic field.

FIG. 2 illustrates the presence of this ambiguity for a transmitting element 1 transmitting a positioning signal 8 along a given axis and the corresponding signal received by a first receiving element 24 oriented to point towards the transmitter versus the corresponding second receiving element 32 oriented to point away from the transmitting element 1. As the positioning signal 1 is an alternating signal, the absolute sign of this signal is unknown by the receivers 24 and 32, such that they both receive the same signal 8 in terms of amplitude.

Figure 3:
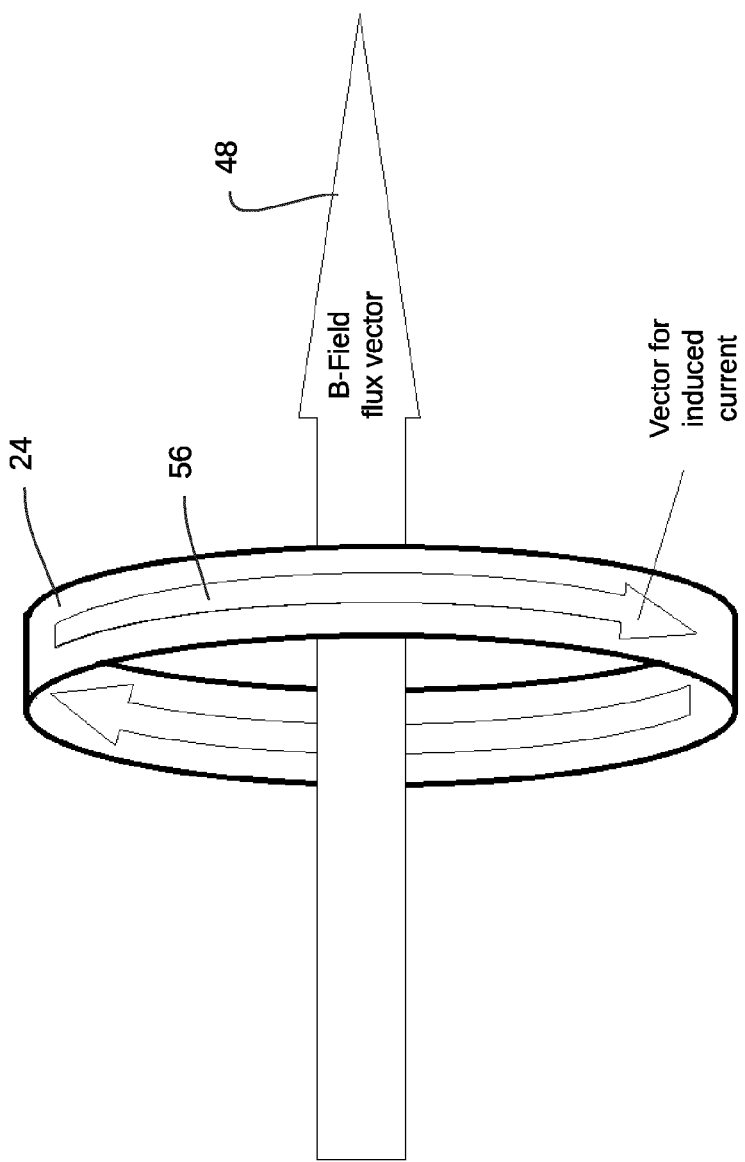
FIG. 3 is a diagrammatical representation of a receiving element receiving a magnetic field flux vector.

FIG. 3 is a diagrammatical representation of a receiving element (ex: receiver 24) receiving a magnetic field flux vector (ex: signal 8). Magnetic flux flowing through the coil of the receiver in the direction indicated by the arrow 48 induces an electric current in a direction defined by vector 56 in accordance with the right-hand rule.

In the illustrated example, the transmitting element 1 is aligned with the X-Y axis plane 40. Based on the right-hand rule, as illustrated diagrammatically in FIG. 2, the magnetic flux line of the transmitted positioning signal passing through the first receiving element 24 from a first direction relative to the polarity of the receiving elements, then a current signal in a first current direction is induced. The magnetic flux line of the transmitted positioning signal passing through the second receiving element 32 from a second direction relative to the polarity of the receiving elements that is opposite the first polarity, then a current signal in a second current direction is induced, this second current direction being opposite the first current direction.

It was observed that the ambiguity of the orientation caused by the symmetry about the transmitting element 1 can be resolved by preserving absolute phase information when positioning signals are received at the receiving sensing elements of the receiver 24, 32. Preserving the absolute phase information herein refers to the absolute phase information of the positioning signal transmitted from the transmitter being preserved within the same positioning signal received at the receiver. Accordingly, absolute phase information within the received positioning signal can be used to directly obtain the corresponding phase information of the transmitted signal. For example, knowing the time of flight elapsed between transmission of a positioning signal and the receiving of the corresponding positioning signal preserves the absolute phase information because the time of flight defines a known temporal offset between the transmission and the receiving.

It was observed that preserving the absolute phase information within the received positioning signals requires overcoming various challenges, such as the clock drifts between the transmitter and the receiver. Recent innovations in time-of-flight distance measurement have led to the development of reasonably accurate two-way ranging in the RF medium. These systems use very precise timing clocks to deterministically send and receive messages between two or more transceivers. The requirements for 2-way ranging through this method have very small error windows in terms of turnaround time.

One such example, the DW1000 from Decawave, is capable of two-way ranging by time of flight and/or time of arrival to an accuracy of 10 cm. This is due to its extremely high frequency internal clock, combined with a deterministic transmission time. This allows for precision tracking of timed events between transceivers.

However, it was observed that preserving the absolute phase information, such as by sufficiently accurately determining the time of flight elapse between transmission and reception, significantly increases the complexity and/or cost of the positioning tracking system.

The "position of the receiver" or variants thereof herein refers to the position of the receiver relative to a transmitter in three-dimensional space. This position can be represented as a distance component and a normalized vector component and/or a scaled vector representing the distance components along each axis of the transmitter's coordinate system.

The "signed position of the receiver" or variants thereof herein refers to the vector components having a sign subcomponent that defines in which direction (ex: in front or in back of) the receiver is positioned relative to the transmitter. The signed position resolves the ambiguity regarding absolute position that exists when the polarity of the received positioning signals is not determined.

The "uniquely associated orientation of the receiver" or variants thereof herein refers to how a receiver is oriented (pointed) with respect to the orientation of the transmitter in the transmitter's coordinate system. The uniquely associated orientation of the receiver is determined based on the determined signed position and is the orientation that is uniquely associated to that signed position of the receiver. The signed position is used to correct any ambiguity that may exist as to the orientation of the receiver relative to the transmitter. Orientations can be represent in a number of ways, including but not limited to, Euler Angles (Yaw, Pitch, Roll), Quaternions (w,x,y,z), and DCM (Directional Cosine Matrices).

Figure 4A:
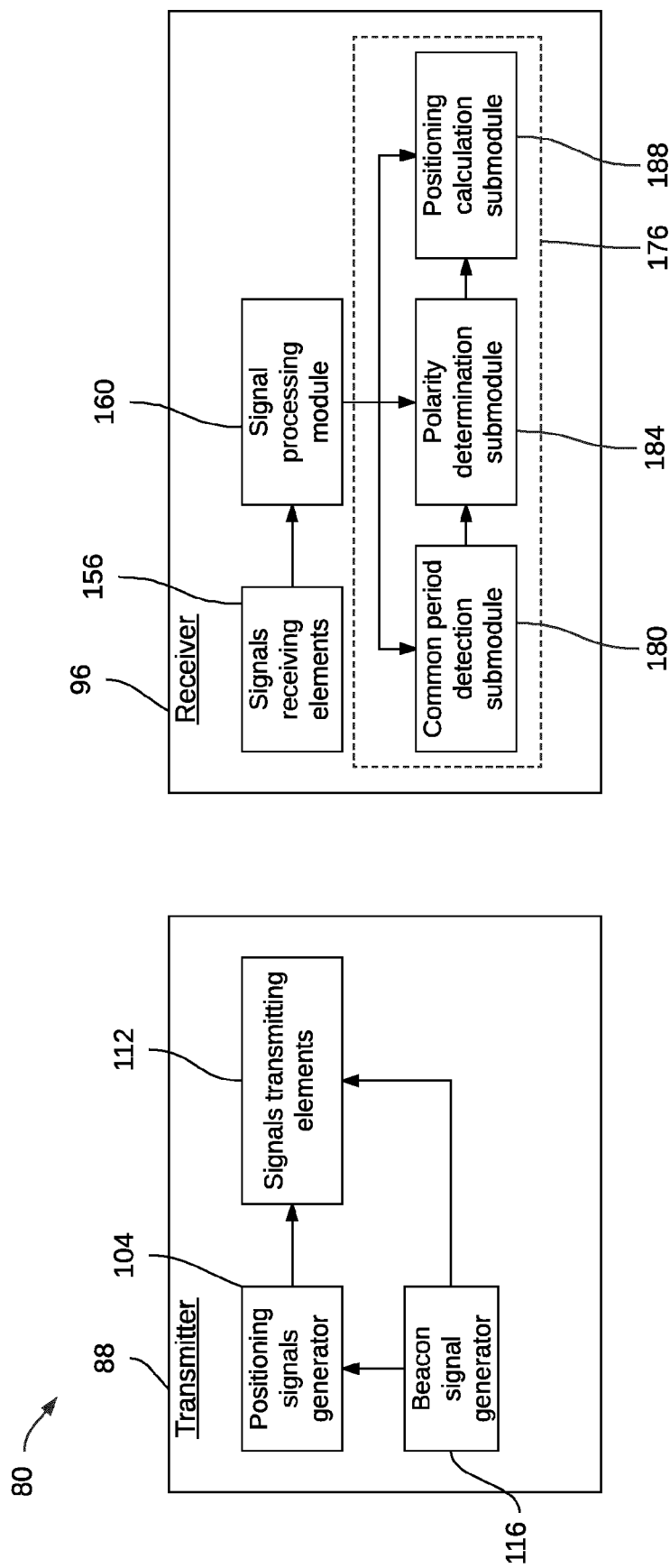
FIG. 4A illustrates a schematic diagram of the operational modules of a positioning system according to an example embodiment.

FIG. 4A illustrates a schematic diagram of the operational modules of a positioning system 80 operable to determine signed position of a receiver relative to a transmitter according to an example embodiment. The system 80 includes a transmitter 88 and at least one receiver 96. The transmitter 88 further includes a positioning signals generator 104 and signal transmitting elements 112. The transmitter 88 may optionally include a beacon signal generator 116, but it will be understood that various example embodiments of the transmitter 88 does not include the beacon signal generator 116.

Figure 4B:
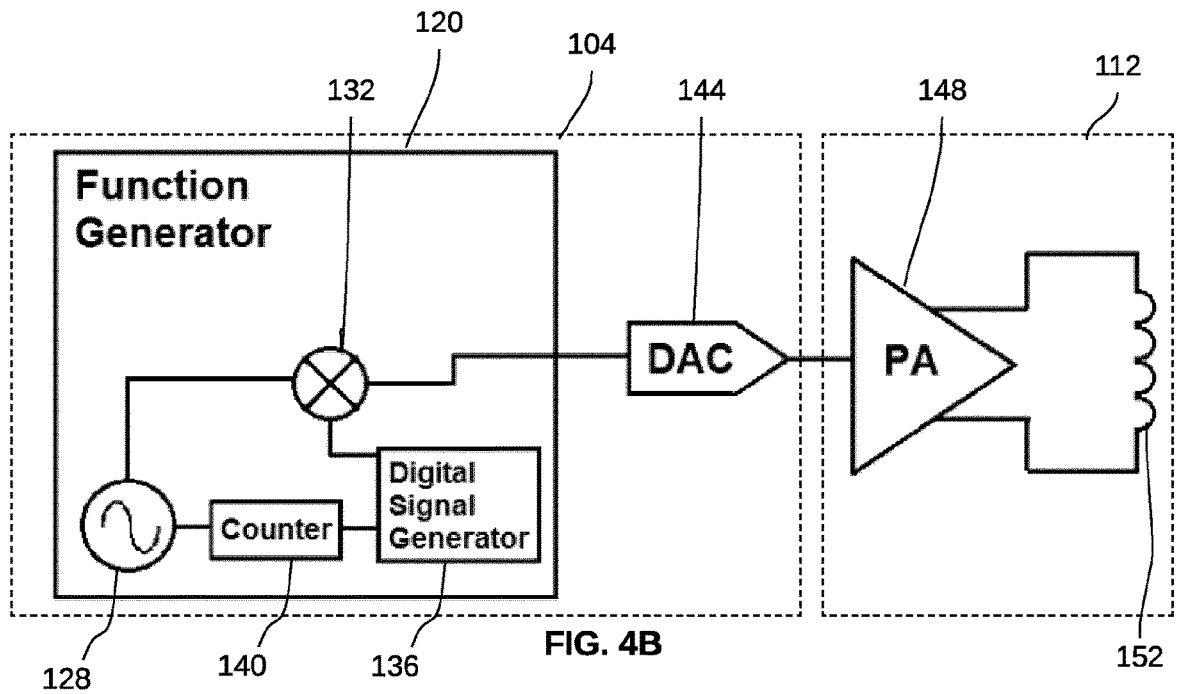
FIG. 4B illustrates a schematic diagram of a positioning signals generator and one signal transmitting element according to one example embodiment.

FIG. 4B illustrates a schematic diagram of a positioning signals generator 104 and one signal transmitting element 112 according to one example embodiment. The positioning signals generator 104 includes a function generator 120 for generating a waveform to be transmitted as a periodic positioning signal. In the illustrated example, the function generator 120 includes a clock generator 128 for generating a driving clock signal. The driving clock signal is multiplexed at a multiplexor 132 with a digital signal generator 136 to generate a digital positioning signal having a desired frequency for the AC analog positioning signal to be transmitted. A counter 140 can be provided for driving the digital positioning generator 136. A digital-to-analog convertor (DAC) 144 receives the digital positioning signal outputted from the multiplexor 132 and converts the signal to an analog waveform.

The analog waveform outputted from the DAC 144 is further received at an amplifier 148 of the transmitting element 112, which outputs an amplified analog electric current that is fed through an electromagnetic coil 152, thereby radiating a magnetic field signal being a transmitted positioning signal.

The function generator 120 can be implemented according to various techniques known in the art, such as using a digital signal processor (DSP), field programmable gate array (FPGA) or a microcontroller.

The transmitter 88 is configured to transmit positioning signals having specific frequency and phase relationships. More particularly, the transmitter 88 is configured to transmit a first transmitted positioning signal having a first frequency response and phase from a first signal transmitting element 112 thereof. The first positioning signal is transmitted in a first direction in space, which may be in the direction of a first axis. The first frequency response includes, or consists of, a first frequency component.

The transmitter 88 is also configured to transmit a second transmitted positioning signal having a second frequency response and phase that is distinguishable from the first frequency response and phase. The second positioning signal is transmitted from a second signal transmitting element 112 thereof. The second positioning signal is transmitted in a second direction in space, which may be in the direction of a second axis. The second frequency response includes, or consists of, a second frequency component that is different from the first frequency component.

The transmitter 88 is further configured to transmit a third transmitted positioning signal having a third frequency response and phase that is distinguishable from the first frequency response and phase and the second frequency response and phase. The third positioning signal is transmitted from a third signal transmitting element 112 thereof. The third positioning signal is transmitted in a third direction in space, which may be in a direction of a third axis. The third frequency response includes, or consists of, a third frequency component that is different from the first frequency component and the second frequency component.

The first axis, the second axis, and the third axis may be mutually orthogonal. However, it will be understood that in other embodiments, the directions of the first, second, and third positioning signals do not necessarily have to be orthogonal.

Similarly, the first, second, and third transmitting elements may be co-located, or co-centric. However, it will be understood that in other embodiments, the directions of the first, second, and third transmitting elements can be differently located.

The first frequency component of the first positioning signal, the second frequency component of the second positioning signal, and the third frequency component of the third positioning signal define a common period that is a common multiple of the three frequency components. One or more of the transmitted positioning signals have identifiable phase characteristics relative to the start of the common period. Transmission of the first, second, and third positioning signals are synchronized such that the start of a first period of the first frequency component, the start of a second period of the second frequency component, and the start of a third period of the third frequency component are aligned in time. Accordingly, the start of the first, second and third periods are aligned with the start of the common period.

Figure 5:
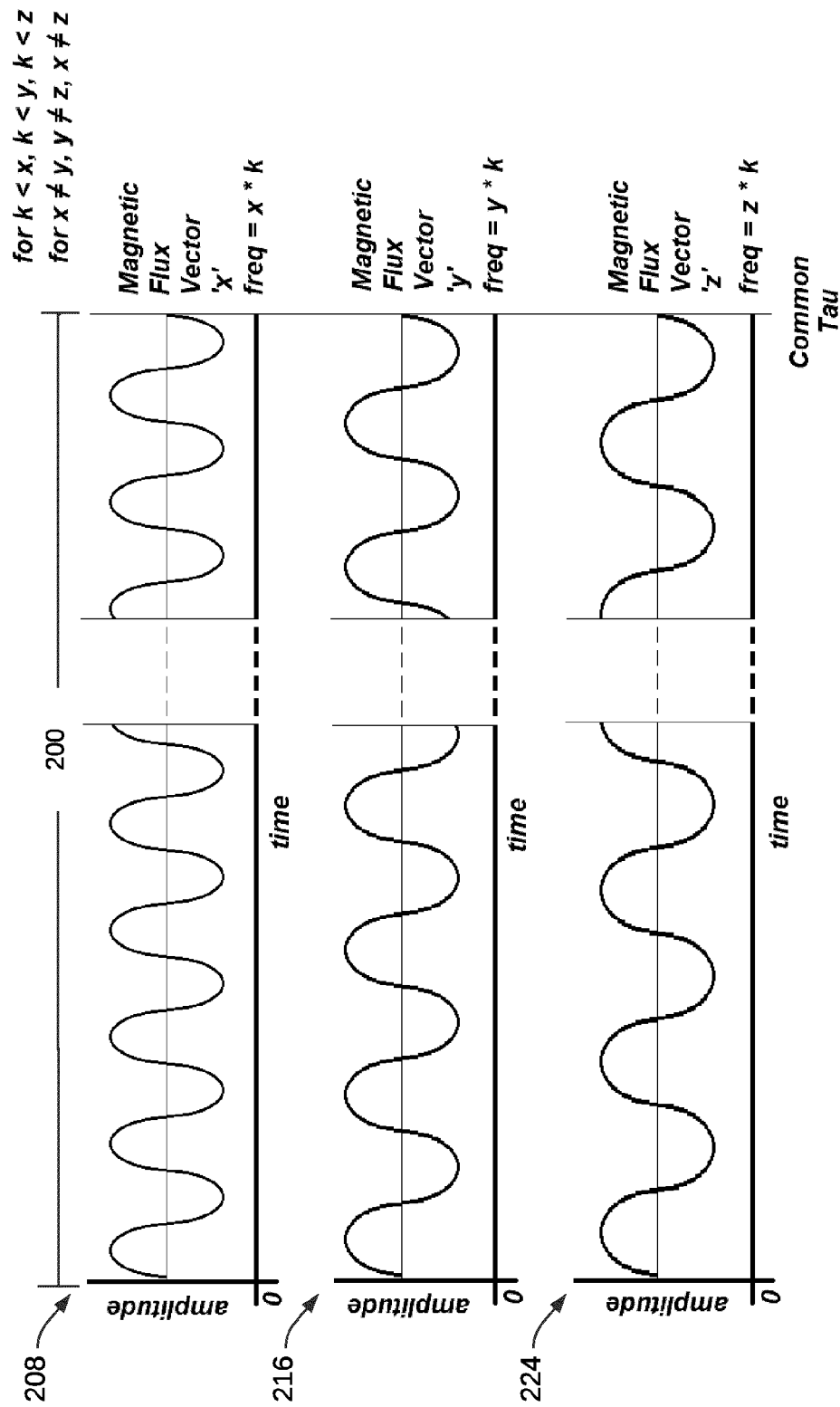
FIG. 5 illustrates a graph showing a common period of waveforms representing a first transmitted positioning signal, a second transmitted positioning signal and a third transmitted positioning signal according to an example embodiment.

FIG. 5 illustrates a graph showing a common period 200 (having a frequency k) of waveforms of a first transmitted positioning signal 208, a second transmitted positioning signal 216, and a third transmitted positioning signal 224 according to an example embodiment. It will be appreciated that the start of the first, second and third transmitted positioning signals are synchronized (as represented by time 0). At this start point, each of the first, second, and third transmitted positioning signals have a rising slope starting from an instantaneous zero-amplitude value. Each of the first, second, and third transmitted positioning signal have a respective predetermined amplitude value. At the end of the common period 200, each of the first, second, and third transmitted positioning signals 208, 216, and 224 are also temporally aligned. As illustrated, the positioning signals 208, 216, and 224 have a rising slope and returning to an instantaneous zero-amplitude value.

Referring back to FIG. 4A, the first, second, and third positioning signals 208, 216, and 224 are received at the receiver 96. The receiver 96 includes signals receiving elements 156, which senses the transmitted positioning signals 208, 216, and 224 having traveled from the transmitter 88 to the signals receiving elements 156.

An analog signal processing module 160 is configured to receive the raw received positioning signals and condition them. The signal processing module 160 is further configured to retrieve the frequency components of each of the received positioning signals. The signal processing module 160 is further configured to convert the analog received positioning signal to a digital received positioning signal.

Figure 4C:
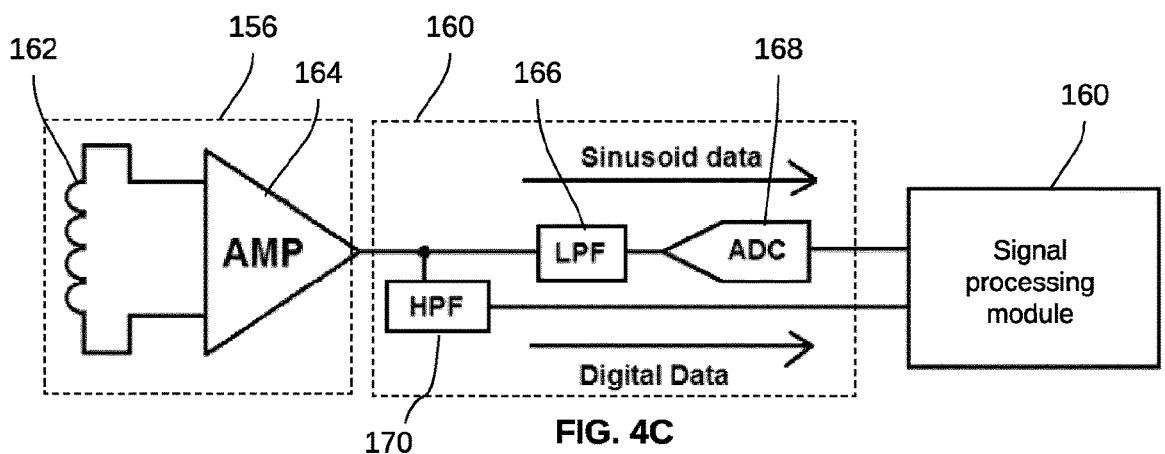
FIG. 4C illustrates a schematic diagram of a signals receiving element and a signal processing module according to one example embodiment.

FIG. 4C illustrates a schematic diagram of a signals receiving element assembly 156 being connected to the signal processing module 160 according to an example embodiment. Magnetic field positioning signals transmitted from the transmitter 88 that reach the signals receiving element 156 induce an electric current in receiving electromagnetic coil 162, which is then amplified by receiving side amplifier 164. The amplified receiving signal may be further passed through a low-pass filter 166 to retrieve the lower frequency information that includes the frequency components of the first, second, and third transmitted positioning signals. This filtered signal can be further converted to a digital signal by an analog-to-digital converter 168. The analog-to-digital converter 168 is chosen to have a sufficiently high sampling rate based on the frequencies of the first, second, and third positioning signals to generate a digital received positioning signal having a sufficiently high resolution.

According to one example embodiment, the amplified received positioning signal may also be passed through a high-pass filter 170 to retrieve high frequency information. The high frequency information may include digital data that is useful for detecting the start of the common period, as described elsewhere herein.

Referring back to FIG. 4A, the receiver further includes a digital signal processing module 176 that receives the digital received positioning signal from the signal processing module 160. The digital signal processing module 176 includes a common period detection submodule 180, a polarity determination submodule 184 and a positioning calculation submodule 188.

Where a first positioning signal 208, a second first positioning signal 216, and a third first positioning signal 224 are transmitted from the transmitter 88, and each of these positioning signal are received at the receiver 96, the signal processing module 160 outputs a first digital received positioning signal corresponding to the first transmitted positioning signal 208, a second digital received positioning signal corresponding to the second transmitted positioning signal 216, and a third digital received positioning signal corresponding to the third transmitted positioning signal 224.

It will be appreciated that each received positioning signal will preserve the frequency and phase information of its corresponding transmitted positioning signal. Accordingly, the frequency components of the received positioning signals also define a common period that has the same length as the common period defined by the transmitted positioning signals. However, the received positioning signal will have a lesser amplitude due to attenuation during travel between the transmitter and the receiver.

The common period detection submodule 180 is configured to determine for the first received positioning signal, the second received positioning signal, and the third received positioning signal at least one time point within these received positioning signals that corresponds to the start of the common period defined by these positioning signals.

The polarity determination submodule 184 is configured to determine a polarity of the first received positioning signal, a polarity of the second received positioning signal, and a polarity of the third received positioning signal. The determination of the polarity for each received positioning signal is based on properties of that positioning signal relative to the determined start of the common period and relative to the predetermined properties of the transmitted positioning signals, as further described herein. The determination is based on the identifiable phase characteristics of one or more of the transmitted positioning signals.

The positioning calculation submodule 188 is configured to determine a signed position of the receiver along each of at least two of a first axis, a second axis, and a third axis based on the determined polarities of the first, second, and third received positioning signals. The positioning calculation submodule 188 can also determine the signed position along three orthogonal coordinate axes. The positioning calculation submodule 188 can also determine the uniquely associated orientation of the receiver 96 with respect to the coordinate system of the transmitter 88.

Figure 6:
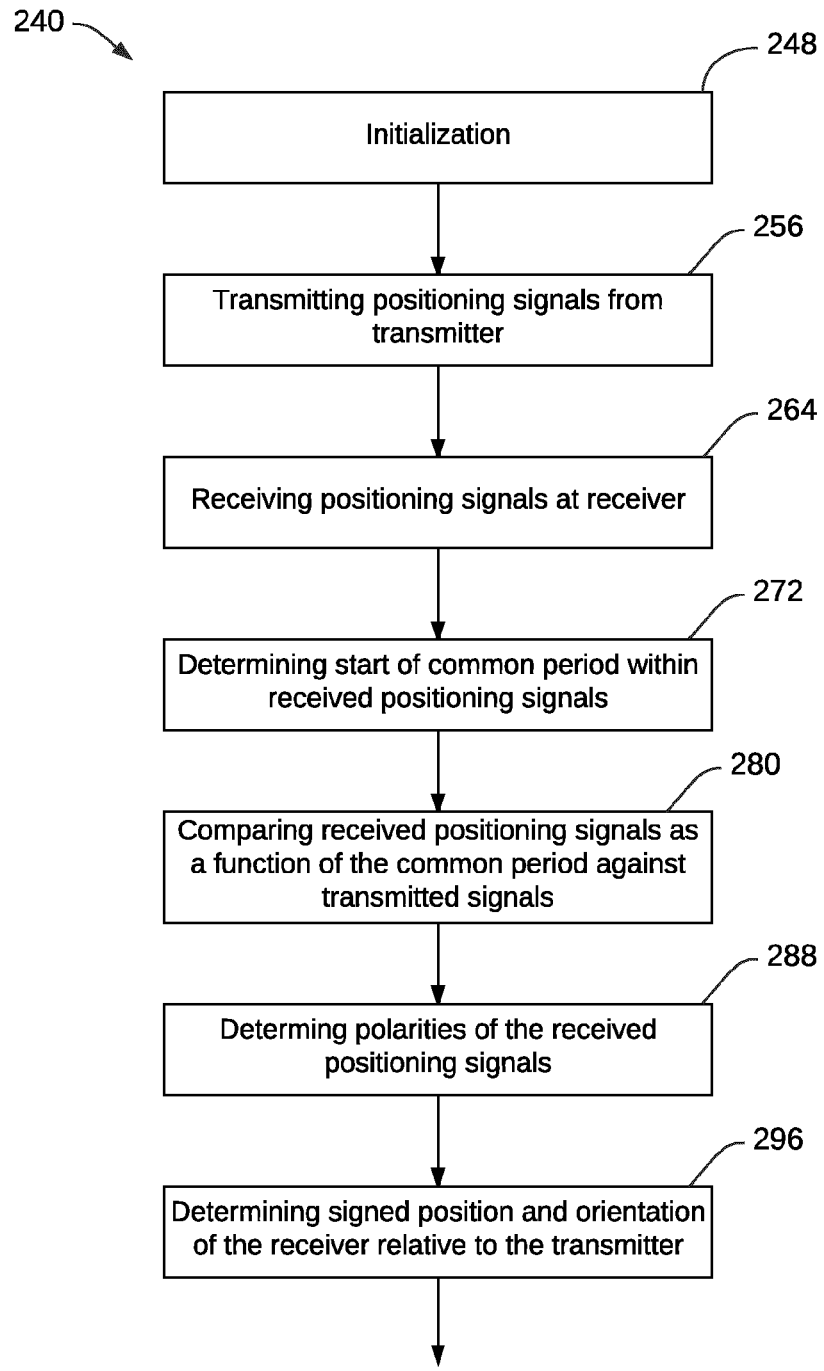
FIG. 6 illustrates a flowchart showing the operational steps of a method for determining the position of a receiver relative to a transmitter according to one example embodiment.

Referring now to FIG. 6, therein illustrated is a flowchart showing the operational steps of a method 240 for determining the position of a receiver relative to a transmitter according to one example embodiment. The method 240 can be carried out using an appropriately configured transmitter 88 and an appropriately configured receiver 96 described herein according to various example embodiments.

At step 248, an initialization step can be carried out. The initialization may include pairing the transmitter 88 and receiver 96, such as defining the frequencies to be used for the transmitted positioning signals, the phase patterns, and/or the phase change patterns.

At step 256, the first, second, and third positioning signals 208, 216, and 224 having the specific frequency relationships defining the common period is transmitted from the transmitter 88.

At step 264, the first, second and third positioning signals 208, 216, and 224 are received at the receiver 96 as received positioning signals.

At step 272, at least one time point within the received positioning signals corresponding to the start of the common period for these signals is determined.

At step 280, properties of the received positioning signals relative to the determined start of the common period is compared against the predetermined properties of the transmitted positioning signals.

At step 288, the polarity of each of the received positioning signals is determined based on the comparison carried out at step 280.

At step 296, the signed position of the receiver 96 relative to the transmitter 88 is determined. The uniquely associated orientation of the receiver 96 can also be determined.

It will be understood that steps 272 to 296 can be repeated in time so that the signed position of the receiver can be constantly updated, such as for situations where the receiver is being displaced through the three-dimensional space. The signed position can be updated sufficiently frequently depending on the application (ex: how quickly the receiver is to be displaced). The updating of the signed position may appear to a human user to be carried out continuously and in real-time.

According to various example embodiments, a beacon signal having a periodic beacon pulse is transmitted along with transmission of the first, second and third positioning signals. The periodic beacon pulse occurs at the start of every common period defined by the first, second and third transmitted positioning signals.

Referring back to FIG. 4A, according to such embodiments, the transmitter includes the beacon signal generator 116 for generating the beacon signal.

The beacon signal is received at the receiver along with the received positioning signals. The received beacon signal also includes the periodic beacon pulse and is synchronized with the common period of the received positioning signals. Accordingly, the time point of a beacon pulse is determined at the receiver as an indicator of the start of one of the common periods.

The polarity of a given received positioning signal can be determined based on the sign of the received positioning signal at a given point in time relative to the time point of the beacon pulse. The given point in time may be the time point of the beacon pulse. Alternatively, the given point in time may be offset by a specific interval of time from the beacon pulse. More particularly, the polarity of the received positioning signal is determined based on whether the sign of the received positioning signal matches with the sign of the corresponding transmitted positioning signal at a corresponding point in time within the transmitted signal relative to the start of the common period of the transmitted signal (ex: at a start of the common period of the corresponding transmitted signal or at a point in time offset by the same interval of time from the start of the common period of the corresponding transmitted signal).

It will be appreciated that the polarity of the received signal is determined based on relative phase information in that the determination is made based on properties of the received positioning signal and its corresponding transmitted positioning relative to any start of any defined common period. The properties may include the phases of the first, second, and third received positioning signals relative to the start of the common period. The precise time of flight between the transmitting of the positioning signal from the transmitter and the receiving of the positioning signal at the receiver is not required for determining polarity. This determination of the polarity is effective for sufficiently low frequencies and sufficiently short operating ranges. It was observed that such frequencies and ranges are orders of magnitude lower than where time of flight becomes a factor.

Figure 7A:
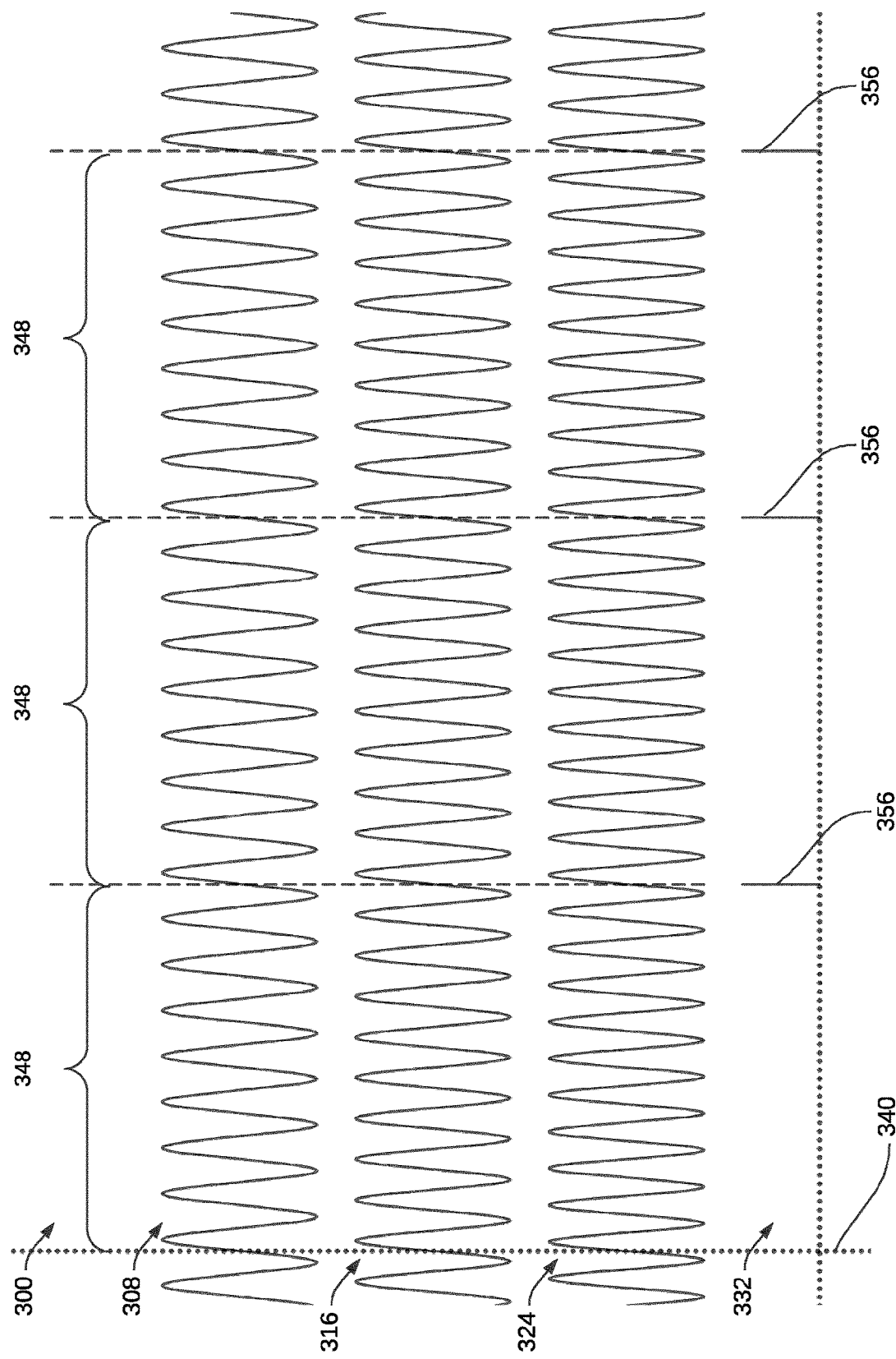
FIG. 7A is a graph showing waveform representations of three positioning signals and a beacon signal that are transmitted according to one example embodiment.

Referring now to FIG. 7A, therein illustrated is a graph 300 showing waveform representations of three positioning signals and a beacon signal that are transmitted for enabling signed positioning determination according to one example embodiment. A first transmitted positioning signal 308 has a first frequency defining a first period. A second transmitted positioning signal 316 has a second frequency defining a second period. A third transmitted positioning signal 324 has a third frequency defining a third period. The three transmitted positioning signals 308, 316, and 324 are synchronized in that at given time point 340, the starts of the first, second, and third periods are aligned and each of the signals 308, 316, and 324 have a rising zero crossing. The transmitted positioning signals 308, 316, and 324 further define a common period 348 being a multiple of the first, second, and third periods. Three full common periods 348 are illustrated. It will be appreciated that the frequency and phase characteristics of the transmitted positioning signals 308, 316 and 324 within any common period is identical to the frequency and phase characteristics of any other common period.

The beacon signal 332 includes periodically repeated beacon pulses 356. The occurrence of each beacon pulse 356 is aligned with the start of a common period 348. In the illustrated example, the beacon signal 332 is transmitted independently of the transmitting of the first, second, and third positioning signal 308, 316, and 324.

The beacon signal 332 can be transmitted as a radio frequency signal. The radio frequency signal can have a custom or proprietary carrier frequency. Alternatively, the beacon signal 332 can be transmitted over a commonly available transmission standard, such as Bluetooth, Wi-Fi, or the like.

Figure 7B:
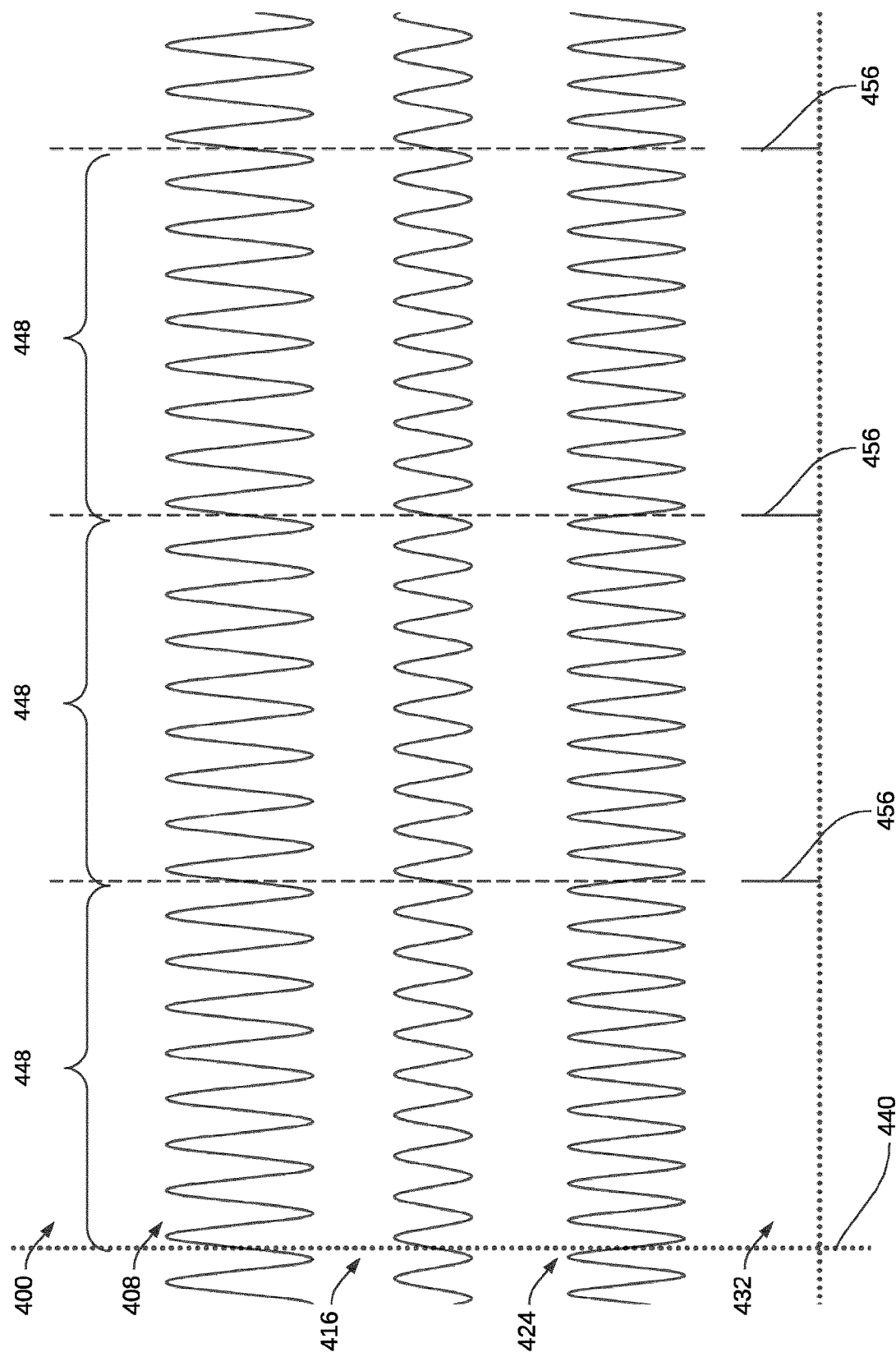
FIG. 7B is a graph showing waveform representations of three received positioning signals corresponding to transmitted positional signals 7A.

Referring now to FIG. 7B, therein illustrated is a graph 400 showing waveform representations of three received positioning signals and a beacon signal that are received at a receiver. The received positioning signals correspond to the transmitted positioning signals illustrated in FIG. 7A. A first received positioning signal 408 has the first frequency and this fact is used to determine that this positioning signal 408 corresponds to the first transmitted positioning signal 308. Similarly, a second received positioning signal 416 has the second frequency and this fact is used to determine that this positioning signal 416 corresponds to the second transmitted positioning signal 316. Furthermore, a third received positioning signal 424 has the third frequency and this fact is used to determine that this positioning signal 424 corresponds to the third transmitted positioning signal 324.

The first, second, and third received positioning signals 408, 416 and 424 define a common period 448 having the same length as the common period 348 of the transmitted signals 308, 316, and 324. The received beacon signal 432 has beacon pulses 456 that are spaced apart from one another by a time interval corresponding to the length of the common period 348.

On the receiver side, and according to the method 240 for determining the signed position of the receiver, the time point within the received positioning signals corresponding to the start of the common period for the received positioning signals is determined by identifying the time point of the occurrence of a beacon pulse 456 within the beacon signal 432. Since the frequency information and phase information of the positioning signals are repeated within each common period, any time-relevant beacon pulse 456 may be used.

Properties of the received positioning signals 408, 416, and 424 relative to the time point of the given beacon pulse 456 are identified. These properties are compared with known properties of the transmitted positioning signals 308, 316, and 324 at a corresponding time point relative to the start of the common period 348.

For example, properties of the positioning signals 408, 416, and 424 at the time point of the given beacon pulse 456 (corresponding to the start of the common period) may be determined. In this illustrated example, at the time point of each beacon pulse, the first received positioning signal 408 has a rising zero-crossing (positive sign indicator), the second received positioning signal 416 has a rising zero-crossing (positive sign indicator), and the third received positioning signal 424 has a falling rising zero-crossing (negative sign indicator).

On the transmitter side, as illustrated in FIG. 7A, each of the transmitted positioning signals have a rising zero-crossing. Accordingly, it is determined that the first received positioning signal 408 and the second received positioning signal 416 are non-inverted in relation to their respective corresponding positioning signals 308, 316 and each signal is assigned a positive polarity. It is further determined that the third received positioning signal 424 is inverted in relation to the corresponding positioning signal 324 and this third received signal is assigned a negative polarity.

FIG. 7B also shows that the amplitude of each of the first, second, and third received positioning signals 408, 416, and 424 are lower than the amplitude of their respective corresponding transmitted positioning signals 308, 316 and 324. The amount of the decrease in amplitude for each received positioning signal 408, 416, and 424 provides information pertaining to the distance between the transmitter and receiver in the three-dimensional space.

The signed position in three-dimensional space of the receiver relative to the transmitter can then be determined based on the assigned polarity and the decrease in amplitude of each of the received positioning signal 408, 416, and 424. Further factors and positioning techniques can also be applied.

In other example embodiments, the beacon signal for indicating the start of the common period within the positioning signal may be embedded in the first, second and third transmitted positioning signals.

Figure 8A:
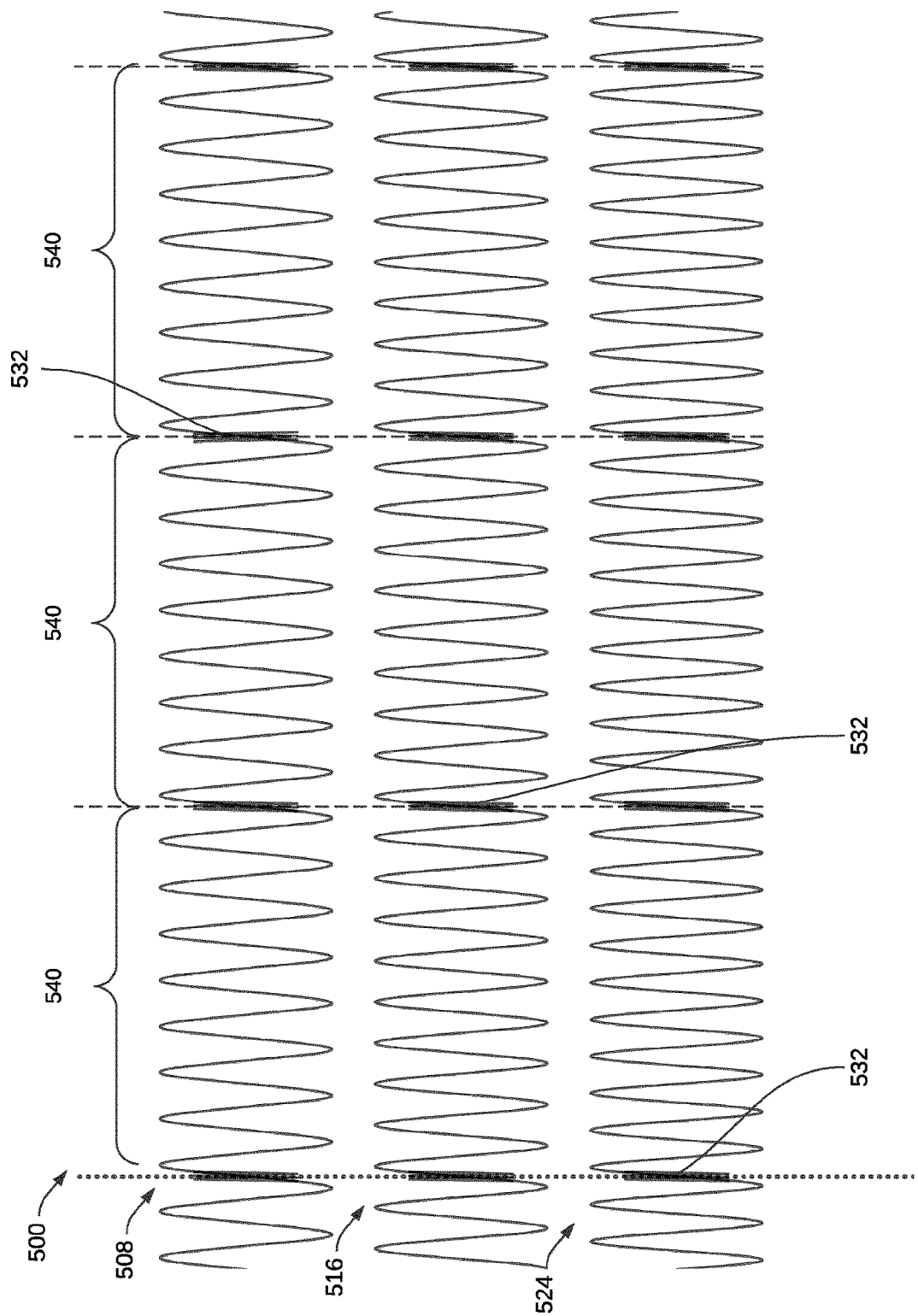
FIG. 8A is a graph showing waveform representations of transmitted positioning signals having embedded beacon signal according to one example embodiment.

Referring now to FIG. 8A, therein illustrated is a graph 500 showing waveform representations of a first transmitted positioning signal 508, a second transmitted positioning signal 516, and a third transmitted positioning signal 524, each having embedded periodic pulses according to one example embodiment. The embedded periodic pulses of the three transmitted positioning signals 508, 516 and 524 together form the embedded beacon signal.

The first, second, and third transmitted positioning signals 508, 516, and 524 are synchronized such that the starts of their respective periods are aligned in time, which defines the start of each common period thereof. In the illustrated example, each of the transmitted positioning signals 508, 516, and 524 also have a rising zero crossing. Each transmitted positioning signal 508, 516, and 524 are modulated for a short interval of time at the start of each common period. Modulated portions 532 are shown in FIG. 8A. The modulated portions 532 imitate a digital signal within the transmitted signal positioning signals 508, 516, and 524.

Figure 8B:
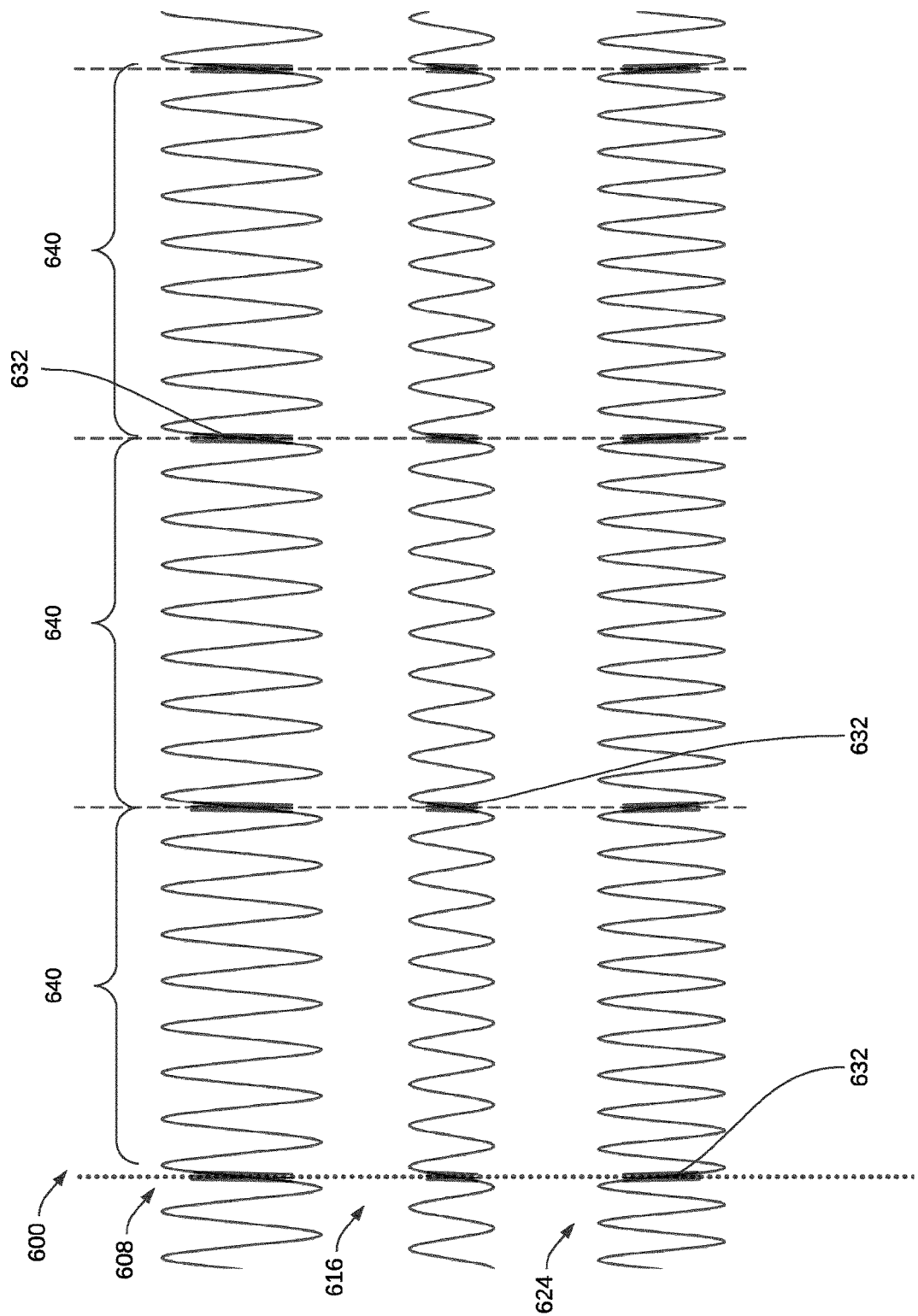
FIG. 8B is a graph showing waveform representations of three received positioning signals corresponding to transmitted positioning signals of FIG. 8A.

Referring now to FIG. 8B, therein illustrated is a graph 600 showing waveform representations of three received positioning signals 608, 616, and 624 corresponding to transmitted positioning signals 508, 516 and 524 of FIG. 8A. As described elsewhere herein with reference to FIGS. 7A and 7B, correspondence between a transmitted positioning signal and a received positioning signal is determined based on matching of the frequency component of the pair of the signals.

The first, second and third received positioning signals 608, 616 and 624 also include the modulated portions 632 corresponding to modulated portions 532 of the transmitted positioning signals 508, 516 and 524. These modulated portions 632 indicate the start of the common period 640 defined within the received positioning signal 608, 616, and 624.

Returning to FIG. 4C, the modulated portions 632 of the received positioning signals 608, 616, and 624 can be separated from the remainder of the signal by passing each of the received positioning signals 608, 616, and 624 through the high-pass filter 170.

On the receiver side, and according to the method for determine the signed position of the receiver, the time point within the received positioning signal corresponding to the start of the common period for the received positioning signals is determined by identifying the time point of the occurrence of each modulated portion 632 within each of the received positioning signals 608, 616, and 624. Since the frequency information and phase information of the positioning signals are repeated within each common period, any time-relevant modulated portion 632 may be used.

Properties of the received positioning signals 608, 616, and 624 relative to the time point of a given modulated portion 632 for each received positioning signal is identified. These properties are compared with known properties of the transmitted positioning signals 508, 516, and 524 at a corresponding time point relative to the start of the common period 640.

For example, properties of the positioning signals 608, 616, and 624 at the time point of a given modulated portion 632 for each signal (corresponding to the start of the common period) may be determined. The properties of the positioning signals 608, 616, and 624 in FIG. 8B are similar to the properties of the positioning signals 408, 416, and 424 illustrated in FIG. 7B, and the polarities of the received positioning signals 608, 616, and 624 can be determined in substantially the same way as described with reference to FIG. 7B.

According to various example embodiments, within the transmitted first, second, and third positioning signals, a subset of two of these three signals have a uniquely identifiable signal pattern at each mutual zero-crossing of the three signals. The mutual zero-crossing of the three signals can occur at the start of each period being a multiple of the frequencies of the transmitted signals. The mutual zero-crossing of the three signals can also occur at each half period of the period that is a multiple of the frequencies of the transmitted signals.

Furthermore, the positioning signals are transmitted such that knowing the relative sign/polarity of the subset of the two signals also allows knowing the sign/polarity of the other signal in relation to the subset. For example, where the transmitted positioning signal are mutually orthogonal, the third signal (ex: Z) is orthogonal in a specific signed direction relative to the signed direction of the first and second signals (ex: X and Y). This relative direction may be defined based on the configuration and definition of the mutually orthogonal signals (ex: Z is orthogonal to X and Y according to the right/left-hand rule).

Figure 9A:
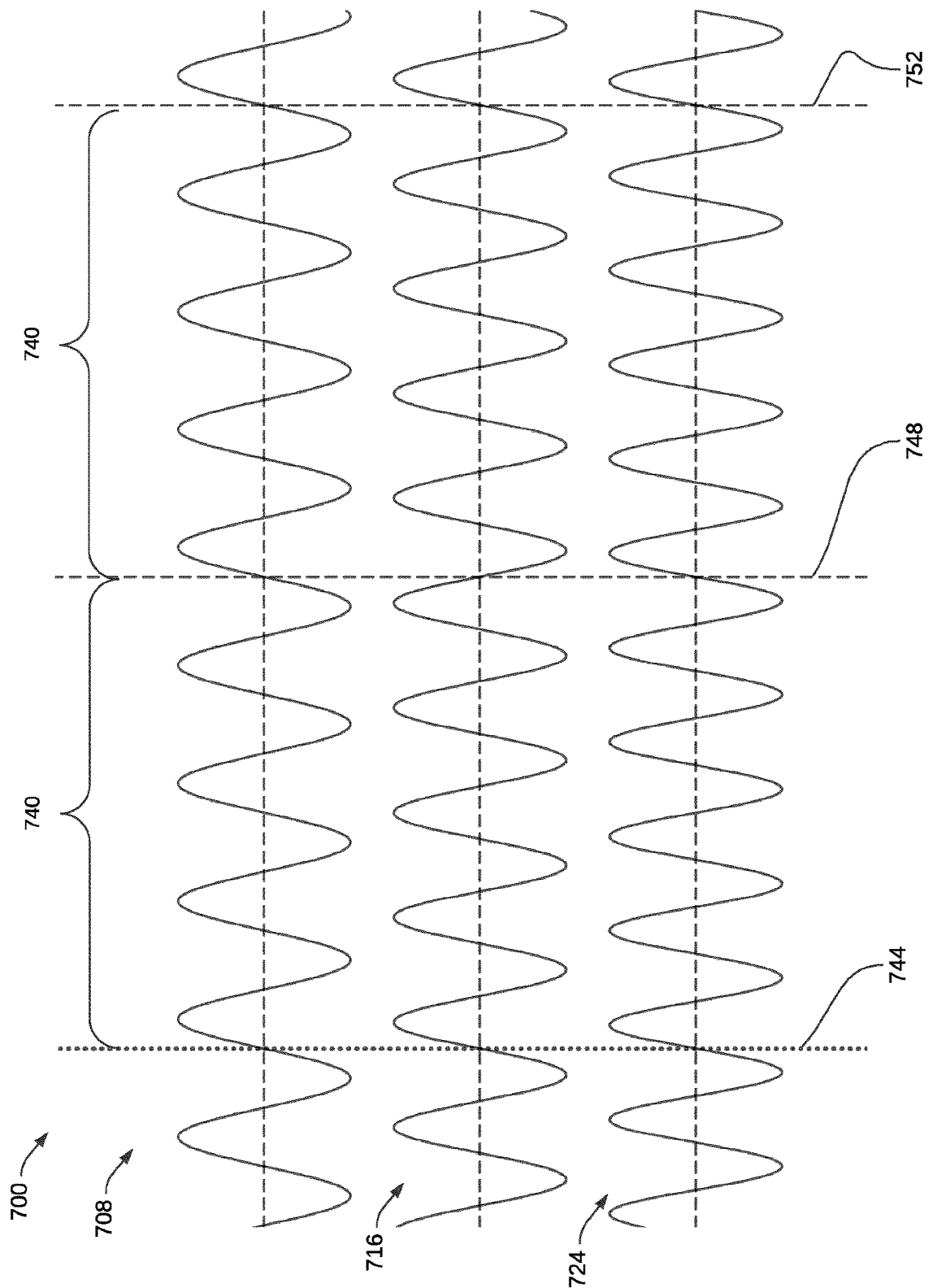
FIG. 9A is a graph showing waveform representations of three transmitted positioning signals according to one example embodiment in which two of the signals have a uniquely identifiable signal pattern at each mutual zero-crossing of the three signals.

Referring to FIG. 9A, therein illustrated is a graph 700 showing waveform representations of three transmitted positioning signals for enabling signed positioning determination in which two of the signals have a uniquely identifiable signal pattern at each mutual zero-crossing of the three signals according to example embodiment. In the illustrated example, each of the transmitted periodic positioning signals have a defined distinct frequency. The three transmitted positioning signals 708, 716, and 724 are synchronized in that at the start of a common period 740, the signals have a mutual zero crossing.

In the example of FIG. 9A, the common period 740 of the three positioning signals are defined by each pair of sequential mutual zero-crossings in time. Two common periods 740 are shown, in which the first common period is defined between first and second mutual zero-crossings 744 and 748 and the second common period is defined between second and third mutual zero-crossing 748 and 752.

Furthermore, in the illustrated example, the first transmitted signal 708 and the third transmitted signals 724 form the subset having the uniquely identifiable signal pattern at each mutual zero-crossing of the three positioning signals. The transmitter is configured such that both of these positioning signals 708, 724 have an even frequency. The second positioning signal 716 has a frequency that is at a midpoint between (i.e. an average of) the frequencies of the first and third positioning signals 708, 724.

By picking the frequencies in this way and properly defining the signed direction of transmission at the start of each common period, the uniquely identifiable signal pattern of the subset of the first and third positioning signals 708, 724 is obtained. In the illustrated example, the subset of the first and third transmitted positioning signals 708, 724 both having a rising zero-crossing at each mutual zero-crossing of the three signals 708, 716, and 724. This obtained property can be used to determined polarity of the corresponding first and third received positioning signals on the receiver-side, as described further below.

It will be appreciated that due to the second positioning signal 716 having a frequency falling at the midpoint between the frequencies of the first and third positioning signals, the second mutual zero-crossing 748 occurs at a half-period of the second positioning signal 716, as represented by a falling slope of the second signal 716 at time 748. However, it will be appreciated that both the first and third transmitted positioning signals 708, 724 still have the uniquely identifiable signal pattern at this mutual zero-crossing 748.

Figure 9B:
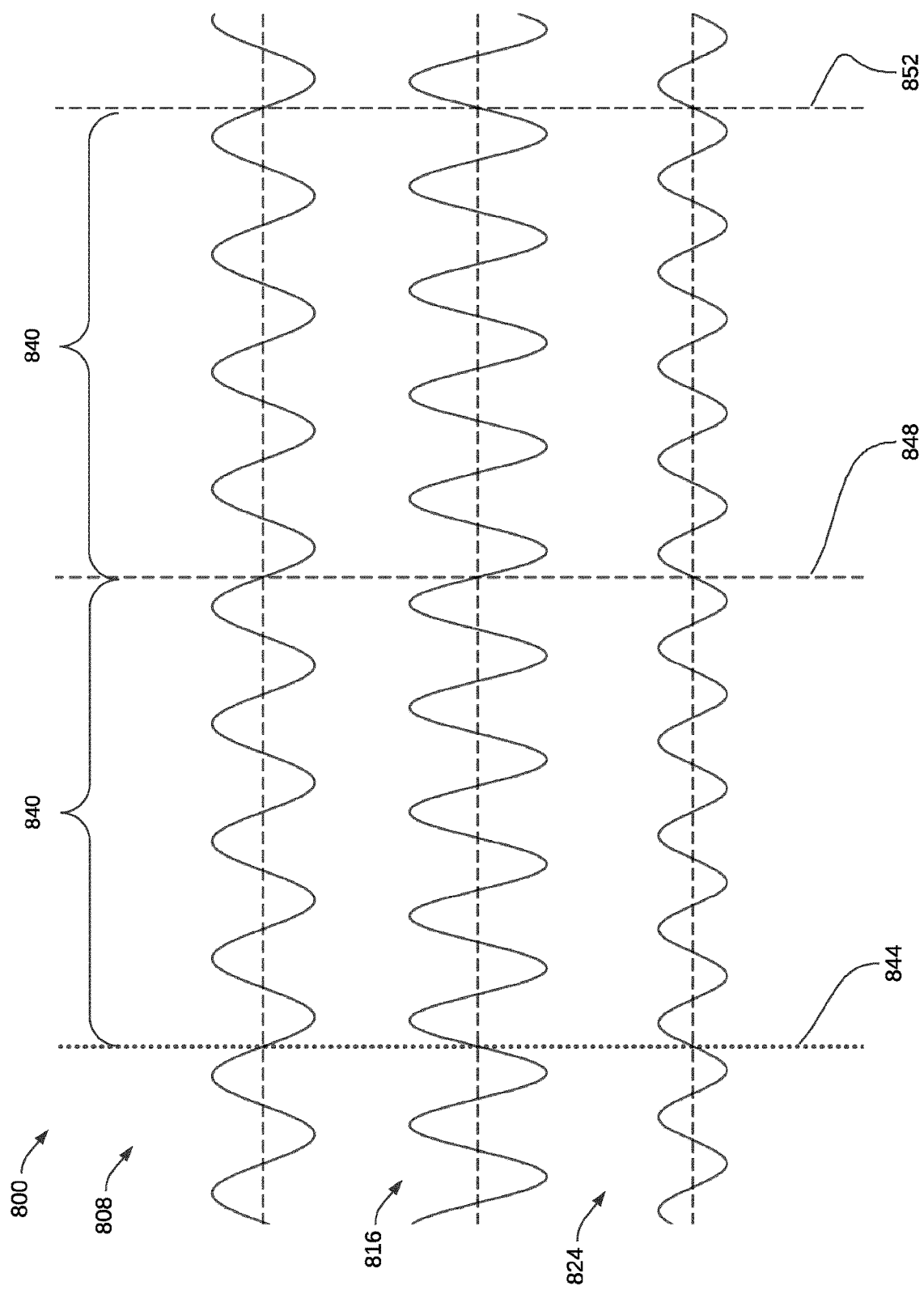
FIG. 9B is a graph showing waveform representations of three received positioning signals corresponding to the transmitted positioning signals of FIG. 9A.

Referring now to FIG. 9B, therein illustrated is a graph 800 showing waveform representations of three received positioning signals 808, 816, and 824 corresponding to transmitted positioning signals 708, 716, and 724 of FIG. 9A. As described elsewhere herein with reference to FIGS. 7A and 7B, correspondence between a transmitted positioning signal and a received positioning signal is determined based on matching of the frequency component of the pair of the signals.

The first, second and third received positioning signals 808, 816, and 824 also exhibit mutual zero-crossings that define common periods 840. These common periods 840 have the same length as the common periods 740 defined by transmitted positioning signals 708, 716, and 724. Furthermore, the first and third received positioning signals 808 and 824 preserve the uniquely identifiable signal pattern of their corresponding transmitted positioning signals 708 and 724. This uniquely identifiable signal pattern on the receiver side can be used to determine the polarities of the received first and third positioning signals 808 and 824 on the receiver side.

After receiving the first, second, and third positioning signals 808, 816, and 824 at the receiver, the time point corresponding to the start of a common period 840 defined by the positioning signals 808, 816, and 824 is determined by determining a mutual zero-crossing of the signals. Within the graph 800, there are three occurrences of mutual zero-crossings of the signals 808, 816, and 824 at time points 844, 848 and 852. Since the frequency information and phase information of the positioning signals are repeated at each mutual zero-crossing, any time-relevant mutual zero-crossing may be used.

The polarities of the subset formed of the first and third received positioning signals 808 and 824 are determined from comparing the pattern of these signals against the uniquely identifiable signal pattern of the corresponding first and third transmitted positioning signals 708 and 724. In the illustrated example, the transmitted positioning signals 708 and 724 both have a rising slope at each mutual zero-crossing of the transmitted signals. At the receiver side, the first receiving positioning signal 808 has a falling slope at the time points of the mutual zero-crossings and the third receiving positioning signal 824 has a rising slope at the time points of the mutual zero-crossings. Accordingly, the first receiving positioning signal 808 is assigned a negative polarity because its slope at the time point of each mutual zero-crossing is inverted relative to its corresponding transmitted positioning signal 708. The third receiving positioning signal 824 is assigned a positive polarity because its slope at the time of each mutual zero-crossing is non-inverted relative to the third positioning signal 824.

Having determined the polarities of the first and the third receiving positioning signals 808, 824, the polarity of the other received positioning signal (second received positioning signal 816) can be determined based on relative orientations of the transmitted positioning signals. For example, where the three transmitted positioning signals are transmitted in mutually orthogonal directions, then the direction of the second transmitted positioning signal is orthogonal to the plane defined by the first and third transmitted positioning signal according to either the right-hand rule or the left-hand rule. Accordingly, the direction of the second received positioning signal has the same directional relationship to the first and third received positioning signal. For example, where the second transmitted positioning signal is orthogonal to the first and third signals according to the right-hand rule, then the polarity of the second received positioning signal can be determined from applying a scalar triple product of the first and third received positioning signals.

Figure 9C:
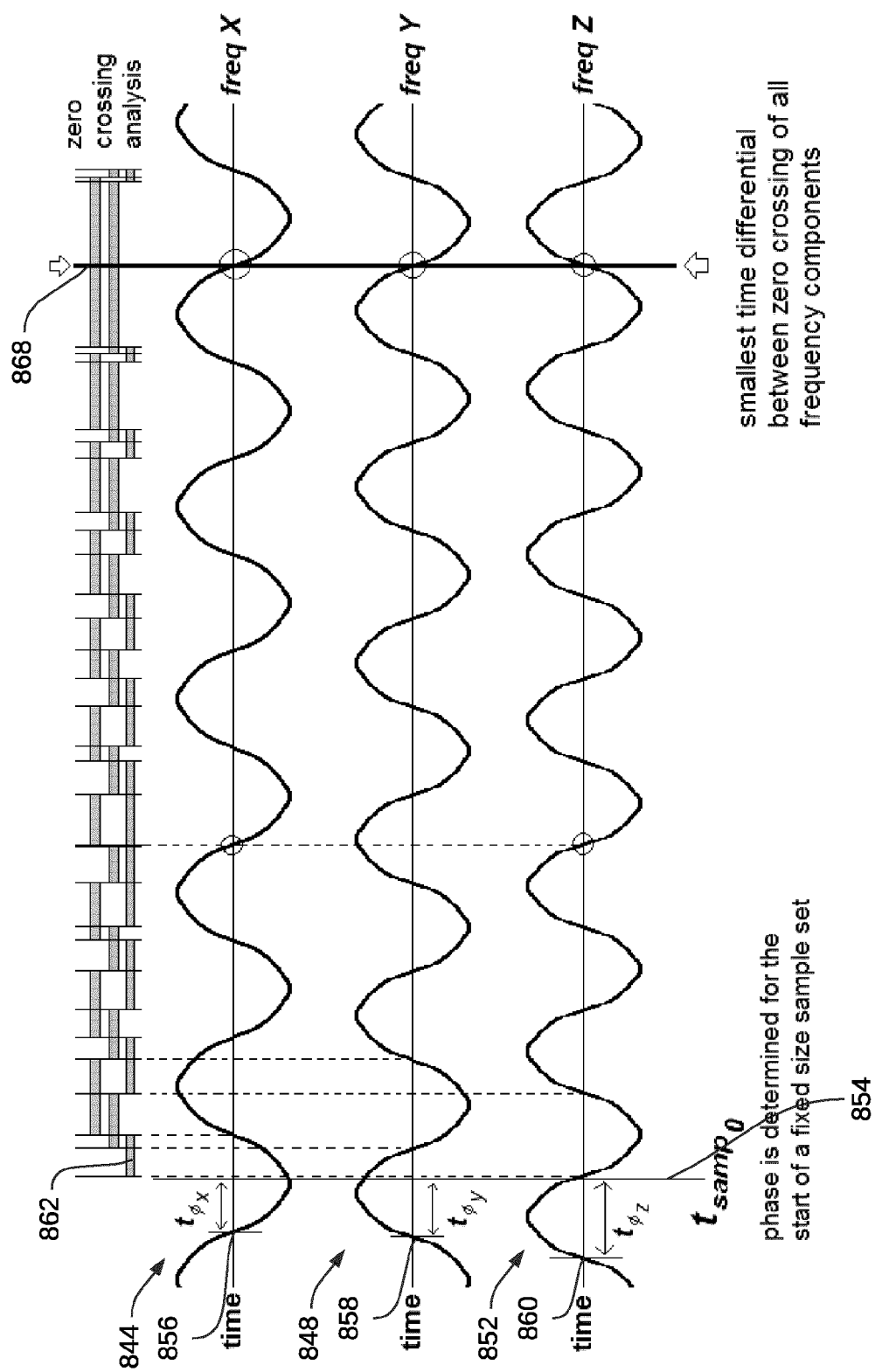
FIG. 9C is a graph showing waveform representations and graphical bars showing a method for determining the mutual zero crossings according to one example embodiment.

Referring now to FIG. 9C, therein illustrated is a waveform representation showing an exemplary method for determining the mutual zero-crossings of the received positioning signals according to one example embodiment. The mutual zero crossings are determined in the time domain from iteratively extrapolating the occurrence of the most recent zero-crossing for each received positioning signal.

For a given sampling set of a first, second, and third received positioning signals 844, 848 and 852 at a given point 854 in time, a time point (856, 858, 860) of the most recent occurrence zero-crossing is determined for each of the signals 844, 848 and 852. The slope of each received signal at the respective time point of the most recent occurrence zero-crossing is also determined. In the illustrated example, the first positioning signal 844 has negative slope at time point 856, the second positioning signal 848 has a positive slope at time point 858 and the third positioning signal 852 has a positive slope at time point 860. A current dataset is tracked and iteratively updated for each positioning signal, this dataset identifying the most recent zero-crossing time point and the current sign for that positioning signal.

The difference in time between the time points 856, 858, and 860 of the respective most recent occurrence of a zero crossing is also obtained. If the difference in time is sufficiently small (less than a predetermined time threshold based on the frequencies of the signals 844, 848, and 852 and the sampling frequency), then it is determined that a mutual zero-crossing has occurred.

Where the difference in time is greater than the predetermined time threshold, it is determined that a mutual zero-crossing has not occurred and iterative extrapolation is continued to seek the next mutual zero-crossing in time. This is carried out by identifying the signal having its zero-crossing occurring the furthest back in time. In the illustrated example, time point 860 of the zero-crossing of the third positioning signal 852 is located the furthest back in time. A half period corresponding to the frequency to this signal is added to the time point of that signal and the current sign for that signal is inverted. In the illustrated example, a half-period is added to the tracked data entry for the third received positioning signal 852 and its current sign is inverted to negative. Subsequent to the addition of the half-period to that signal, the difference in time of the time points of the tracked zero-crossings for the three signals is compared again to determine if a mutual zero-crossing has occurred. If a zero-crossing has not occurred, the addition of the half-period and the inversion of the sign are carried out for the signal having the zero-crossing that is furthest back in time. The addition of the half-period is carried out for the second received positioning signal 848.

The time differences between the time points of the most recent zero-crossings as the iterative extrapolation of zero crossings is graphically represented by bars 862, the difference calculated between the time points of the most recent and the earliest zero-crossing time points within the tracked dataset, and the difference being calculated after each addition of a half period. When the time difference is sufficiently small such that a mutual zero-crossing is identified, the sign of the current dataset is used to determine the polarity of each of the received positioning signals.

In the illustrated example, as iterative extrapolation is carried out, time point 868 is reached and a mutual zero crossing is identified. The current dataset will identify that the first received positioning signal 844 has a falling slope and the third positioning signal has a rising slope.

Figure 9D:
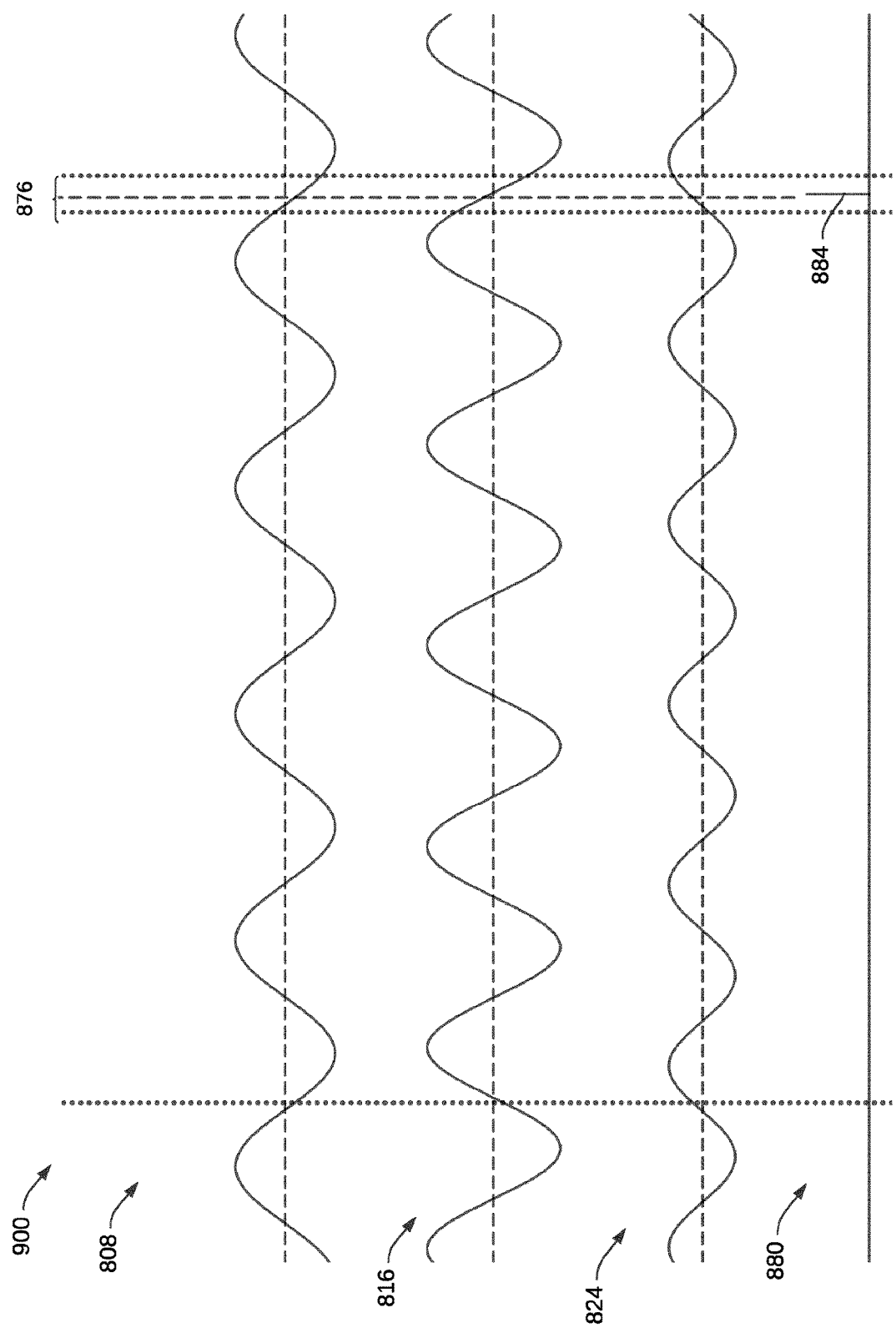
FIG. 9D is a graph showing waveform representations of three received positioning signals of FIG. 9B in which some phase shifting has occurred.

Referring now to FIG. 9D, therein illustrated is a graph 900 showing waveform representations of three received positioning signals 808, 816, and 824 of FIG. 9B, in which one or more of the received positioning signals 808, 816 and 824 have undergone some phase shifting from the transmission to the receiving. As a result of the phase shifts, the mutual zero crossings of the signals are not exactly aligned in time. According to one example embodiment, a tolerance window 876 can be defined, wherein if the time difference between the zero-crossings is sufficiently small so as to fit within this window, then it is determined that a mutual zero crossing has occurred.

In a variant embodiment, a beacon signal 880 can also be provided, wherein the beacon pulses when transmitted occur at the same time as the start of the common period of the transmitted positioning signals. At the receiver, as represented in FIG. 9D, the beacon pulses can be used to validate the identification of any mutual zero-crossing in time. In the illustrated example, a beacon pulse 884 is used to define the tolerance window 876. Where each of the received positioning signals have a zero crossing that occurs within the window 876, it is determined that a mutual zero-crossing has occurred.

In a further variant, the mutual zero-crossing can be detected even where the mutual zero-crossing detected according to the method described with reference to FIG. 9C falls outside out of a tolerance window 876. Accordingly, where a mutual zero-crossing is detected at a distance greater than half the period of the first, second, and/or third received signal from the beacon pulse, the sign of the receiving signals at the mutual zero-crossing are inverted (ex: rising to falling or vice-versa).

According to one example embodiment, the periods of the frequency components of the first, second, and third transmitted positioning signals define a common sub-period is that is a multiple of the periods of the transmitted positioning signals. A sequence of the common sub-periods within the transmitted positioning signals then forms the common period defined by the transmitted positioning signals. In the transition between each common sub-period of the common period, at least one of the transmitted positioning signals exhibits a phase change. That is, at the start of each common sub-period, the transmitted positioning signals define a particular phase change pattern. Within each common sub-period, the transmitted positioning signals have a particular phase pattern for that sub-period. Furthermore, within a common period, a sequence of phase change patterns is defined and a sequence of phase patterns is defined. The sequence of phase change patterns and the sequence of phase patterns are repeated in time.

A phase change pattern at the start of a common sub-period is defined by which positioning signals exhibited a phase change and which positioning signals did not exhibit a phase change. For example, the phase change for any given positioning signal may be an inversion of that signal. For example, the occurrence of a phase change can be denoted by a binary "1" and the lack of a phase change can be denoted by a binary "0".

Within the sequence of phase change patterns for a common period, each phase change pattern is distinguishable from any other phase change pattern of the sequence. Using the binary notation, a set of binary digits representing a given phase change pattern is different from the set of binary digits representing any other phase change pattern. The method of arranging the phase patterns and phase change patterns is similar to a phase shift keying sequence.

Figure 10A:
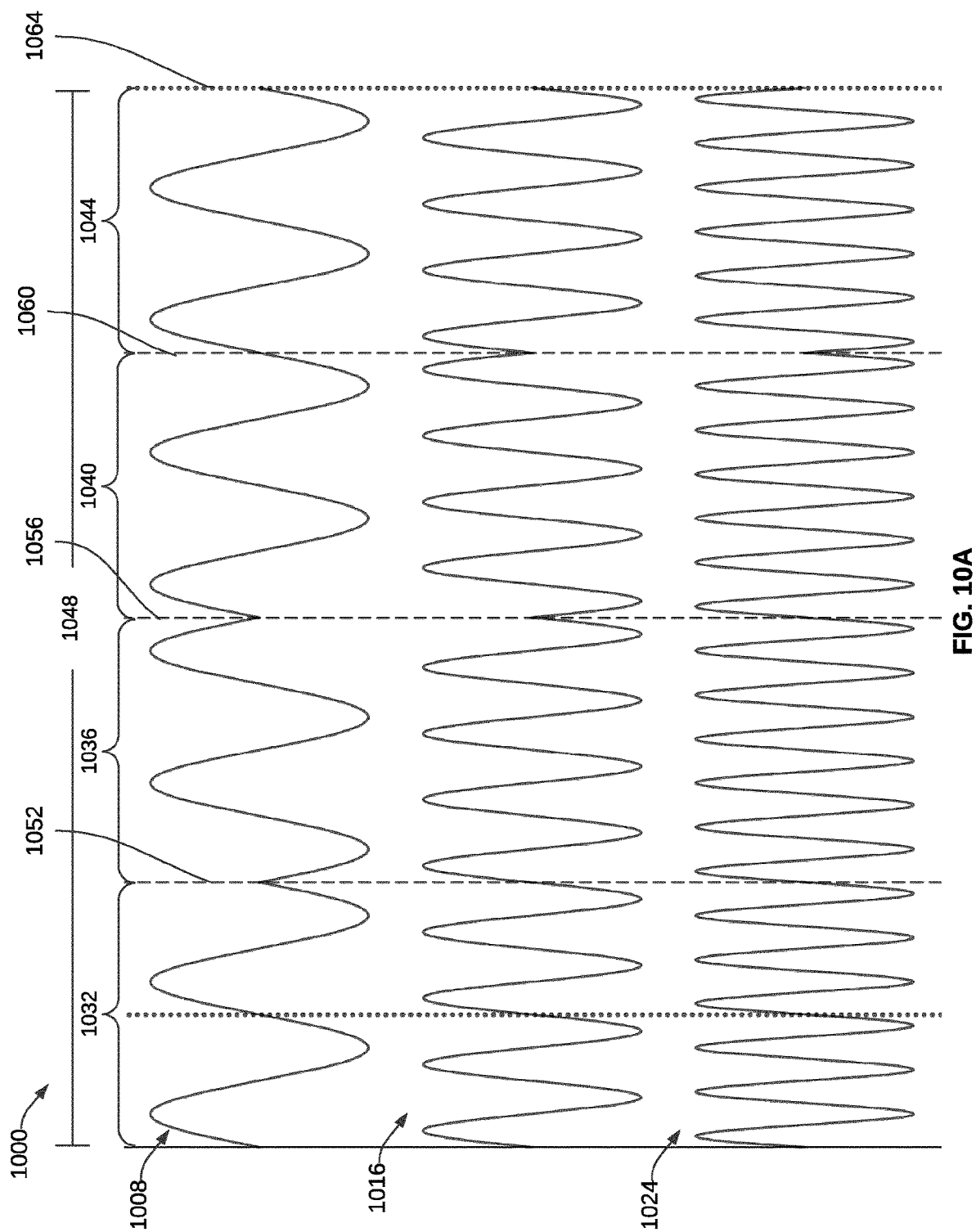
FIG. 10A is a graph showing waveform representations of three transmitted positioning signals defining a sequence of phase patterns and a sequence of phase change patterns according to one example embodiment.

Referring now to FIG. 10A, therein illustrated is a graph 1000 showing waveform representations of three transmitted positioning signals 1008, 1016 and 1024 defining a sequence of phase patterns and a sequence of phase change patterns according to one example embodiment. In the illustrated example, the second positioning signal 1016 has a frequency that is twice the frequency of the first positioning signal 1008 and the third positioning signal 1024 has a frequency that is three times the frequency of the first positioning signal 1008. However, it will be understood that other sets of frequencies may be used. In one example embodiment, the frequencies of the three positioning signals are three successive integer multiples of a common root frequency (ex: 100 times, 101 times and 102 times a common root).

In the illustrated example, each common sub-period has a duration corresponding to two periods of the first positioning signal 1008. Four common sub-periods 1032, 1036, 1040 and 1044 are illustrated in FIG. 10A to form a common period 1048. In the first sub-period 1032, each of the first, second, and third positioning signals 1008, 1016, and 1024 have a positive waveform. This can be denoted by the binary digit set "000".

At the start 1052 of the second common sub-period 1036, the phase of the first positioning signals 1052 is inverted while the phases of the other two positioning signals 1016, 1024 are unchanged. Accordingly, the phase change pattern for start 1052 can be denoted by the binary digit set "100".

Second common sub-period 1036 has a phase pattern of negative waveform, positive waveform, and positive waveform for the first, second, and third positioning signals 1008, 1016 and 1024, respectively, and can be denoted by the binary digit set "100".

At the start 1056 of the third common sub-period 1040, the phase of both the first and second positioning signals 1008, 1116 is inverted, while the phase of third positioning signal 1024 is unchanged. This phase change pattern for start 1056 can be denoted by the binary digit set "110".

Third common sub-period 1040 has a phase pattern of positive waveform, negative waveform, and positive waveform for the first, second, and third positioning signals 1008, 1016 and 1024, respectively, and can be denoted by the binary digit set "010".

At the start 1060 of the fourth common sub-period 1044, the phase of both the second and third positioning signals 1016, 1024 is inverted, while the phase of first positioning signal 1008 is unchanged. This phase change pattern for start 1060 can be denoted by the binary digit set "011".

Fourth common sub-period 1044 has a phase pattern of positive waveform, positive waveform, and negative waveform for the first, second, and third positioning signals 1008, 1016 and 1024, respectively, and can be denoted by the binary digit set "001".

At the end 1064 of the fourth common sub-period 1044, which corresponds to the start of the first common sub-period 1032 of the next long period 1048, the phase of the third positioning signal 1024 is inverted while the phase of the first and second positioning signals 1008 and 1016 is unchanged. This phase change pattern for time point 1064 can be denoted by the binary digit set "001".

Having configured the transmitter 88 to transmit first, second, and third positioning signals 1008, 1016, and 1024 to define the given sequence of phase change patterns and the given sequence of phase patterns, the determining the start of the common period defined by the received positioning signals includes determining the start of at least one common sub-period. Furthermore, the position of the start of that given common sub-period within the sequence of phase change patterns is determined based on the phase change pattern occurring at that start. Having located the position within the sequence of phase change patterns and the sequence of phase patterns, the polarity of the first, second, and third received positioning signals can be determined by comparing the phase patterns of these received signals against the phase pattern of the transmitted positioning signals for that position within the sequence of phase patterns.

Figure 10B:
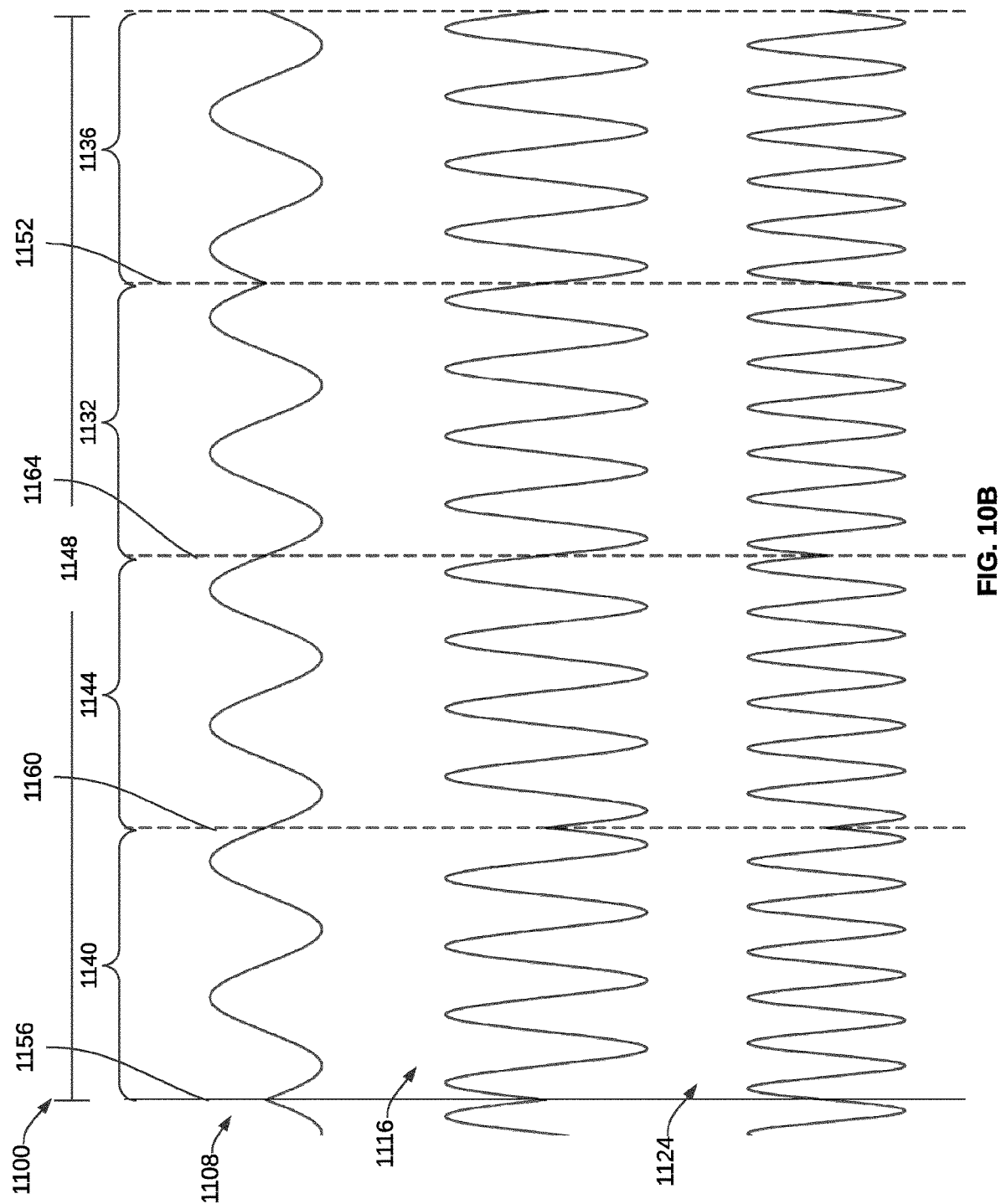
FIG. 10B illustrates a graph showing waveform representations of three received positioning signals corresponding to transmitted positioning signals of FIG. 10A according to one example embodiment.

FIG. 10B illustrates a graph 1100 showing waveform representations of three received positioning signals 1108, 1116, and 1124 corresponding to transmitted positioning signals 1008, 1016, and 1024 according to one example embodiment. A transition in phase patterns is detected at time point 1156 from the detected occurrence of phase changes. At this specific time point 1156, both the first and second received positioning signals 1108, 1116 exhibit a phase change while the phase of the third received positioning signal 1124 is unchanged. Accordingly, the phase change pattern can be denoted by binary digit set "110". This phase change pattern is matched to corresponding phase change pattern of the transmitted positioning signals denoted by the binary digit set "110", which occurs at the start of the third common sub-period 1040 within the sequence of phase change patterns of a common period 1048 defined by the transmitted positioning signals. Accordingly, the common sub-period 1140 following the time point 1156 within the received positioning signals corresponds to the third common sub-period within the sequence of sub-periods of the common period 1148.

The phase pattern defined by receiving positioning signals 1108, 1116 and 1124 during the common sub-period 1140 is then compared against the phase pattern for the corresponding common sub-period 1040 of the transmitted positioning signals 1008, 1016, and 1024. Whereas the transmitted positioning signals 1008, 1016, and 1024 have the phase pattern of positive, negative, positive (denoted by binary digit set "010") during common sub-period 1040, the received positioning signals 1108, 1116, and 1124 have the phase pattern of negative, positive, positive (denoted by binary digit set "100"). Those received signals being inverted with respect to their corresponding transmitted signals are assigned a negative polarity. In the illustrated example, first and second received positioning signals 1108, 1116 are assigned a negative polarity and the third received positioning signal 1124 is assigned a positive polarity.

It will be understood that in the illustrated example, at any time point where there is an occurrence of one or more phase changes in the received positioning signals, the pattern of the phase transitions can be used to determine the position within the sequence of phase change patterns. The phase pattern of the received positioning signals corresponding to that time point (ex: the phase pattern temporally following that time point) can then be compared to the known phase pattern for that position within the sequence of phase patterns of the transmitting position signals. This comparison allows determination of the polarities of the received positioning signals.

FIG. 10C illustrates a graph showing waveform representations of three received positioning signals in combination with a beacon signal according to one example embodiment. The beacon signals include a plurality of beacon pulses 1172 each defining a tolerance window 1180. The tolerance windows 1180 indicate where a phase change pattern is to occur.

According to various example embodiments described herein with reference to FIGS. 7A to 10C, the received positioning signals are sampled with a sufficiently high resolution to accurately obtain phase information required to determine the start of a common period. The sampling may be carried out in a non-stop manner in time. This allows tracking the change in phases of the received signals over time and allows for substantially real-time determination of the signed position of the receiver relative to the transmitter.

Various example embodiments described herein with reference to FIGS. 7A to 10C are used to determine a signed position of the receiver based on the determined polarity. In one example embodiment, the relative signs of received vector components are determined. The received magnetic field vector for a given frequency is constructed using the FFT bin outputs for that frequency from each of the three electromagnetic coils 162, which produces three complex outputs. The magnitude of each of the three complex outputs is further calculated to obtain an all positive vector. Then the relative signs of the two coils having the smallest magnitudes are determined by calculating the dot product of the complex output associated with each of those coils with the complex output of the coil having the greatest magnitude. If the dot product is negative, then a negative sign is applied to that component of the magnetic field vector. For example, for a transmitted frequency F(x,y,z) as received by coils Cx, Cy, and Cz, if |Cy|>|Cx| and |Cy|>|Cz|, then the sign of |Cy| is first assumed to be positive. The sign of |Cx| is computed as the sign of Cy·Cx and the sign of |Cz| is computed as the sign of Cy·Cz. This reduces the possible field vectors associated with a given frequency from 8 to 2. This is carried for each of the three frequencies of the three transmitted signals. The absolute sign for each of the magnetic field vectors can then be determined based on the determined polarities.

Once all three magnetic field vectors (Fx, Fy, Fz) for the transmitted positioning signals have the correct sign applied to them, the sensors position P can be disambiguated from 8 octants down to 2 octants. To further disambiguate down to a single octant, it is required (ex: during the initialization phase) that the receiver be initialized to a given positive or negative hemisphere (ex: positive Z hemisphere +Pz). Then, to compute the sign of the Px and Py components of the position P, the magnetic field vectors Fx and Fy are compared to the magnetic field vector Fz using a dot product. If the dot product of any two magnetic field vectors are negative, then the components of the position vector associated with those two fields have opposite signs. For example, assuming Pz is positive, the sign of Px is calculated as the sign of Fz·Fx and the sign of Py is calculated as the sign of Fz·Fy.

This characteristic relationship between orthogonally transmitted magnetic fields is caused by the way the magnetic field vectors, transmitted by 3 mutually orthogonal transmitters, curl through space with respect to each other. For mutually orthogonal transmitters, if two fields are less than 90 degrees apart (represented by a positive dot product) then the position components associated with those two fields will have the same sign, either both positive or both negative. Conversely, if the two fields are separated by an angle of greater than 90 degrees, then the signs of the position components will have opposite signs, one positive the other negative. For transmitters which are not mutually orthogonal, the reference angle used will be the same as the angle between the transmitters. For instance, if the transmitters are all 80 degrees apart, then the angle between the fields will be determined to be greater than or less than 80 degrees apart as received by the receiver. This results in a single position vector, with a unique signed position and uniquely associated orientation relative to a transmitter.

Following initialization for the given hemisphere, the signs of the field vectors can be tracked from sample to sample in time, including having the receiver cross into a negative hemisphere. Such tracking is based on the determining which position component currently has the greatest magnitude, and using the sign of that component as the reference when comparing angles between field vectors. For instance, if the magnitude of the Px component of position P is greater than the magnitudes of the Py and Pz components, then the sign of the Py and Pz components are calculated as the sign of Px multiplied by the sign of Fx·Fy and Fx·Fz respectively.

Once the signed position is calculated, the uniquely associated orientation of the receiver relative to the orientation of the transmitter can then be computed. To compute the uniquely associated orientation, first the signed position is used to calculate the theoretical magnetic field vectors that should be present at said signed position, relative to the coordinate system of the transmitter. This can carried out by combining the radial and tangential components of a magnetic field relative to a transmitting coil. Once the theoretical magnetic field vectors are determined, they are compared to the three magnetic field vectors as received by the receiver. The uniquely associated orientation computed is the orientation which rotates all three vectors from the transmitters coordinate system to the receivers local coordinate system.

Advantageously, various example embodiments described herein enable determining the signed position and uniquely associated orientation of a receiver relative to a transmitter in 8 octants around the transmitter, where initial conditions are provided. Where initial conditions are not provided, determination of the signed position and uniquely associated orientation in 4 octants is achieved. This can significantly increase the space in which position and orientation of the receiver can be tracked.

Various example embodiments described herein are operable for determining position and orientation of the receiver using wireless positioning signals.

As described elsewhere herein, various example embodiments described herein do not require determination of absolute time of flight of positioning signals between the transmitter and the receiver.

Some example embodiments described herein are operable with none or minimal certification. For example, such embodiments do not require external RF channels or use channels that are already certified.

Various example embodiments described herein provide for a variety of phase synchronization/detection methods, allowing the system to be easily integrated with or on a number of existing platforms and technologies.

Various example embodiments described herein are operable using only deterministic calculations. That is, there is no need to iterate towards a correct solution via feedback between orientation and position, iterating over multiple data sets, and/or integration with inertial measurement units or any other complementary positioning systems. This allows the position and orientation calculation modules to be implemented on lower cost hardware.

Various example embodiments advantageously have reduced cost of implementation and/or reduced complexity. For example, only a few frequencies are transmitted at a time. Furthermore, synchronization between transmitter and receiver can be achieved using existing standards, such as WiFi or Bluetooth. In other example embodiments, synchronization of transmitted signals and received signals can be achieved using only magnetic fields, which also reduces complexity.

While the above description provides examples of the embodiments, it will be appreciated that some features and/or functions of the described embodiments are susceptible to modification without departing from the spirit and principles of operation of the described exemplary embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A method of determining a position of a receiver relative to a transmitter, the method comprising:
    transmitting from the transmitter a first transmitted positioning signal having a first frequency and phase in a first direction;
    transmitting from the transmitter a second transmitted positioning signal having a second frequency and phase in a second direction, the second frequency being different from the first frequency;
    transmitting from the transmitter a third transmitted positioning signal having a third frequency and phase in a third direction, the third frequency being different from the first frequency and the second frequency, the first positioning signal, the second positioning signal and the third positioning signal defining a common period being a common multiple of the periods of the first, second, and third positioning signals;
    transmitting a beacon signal having a periodic beacon pulse corresponding to the start of every common period defined by the first, second and third transmitted positioning signals;
    receiving, at the receiver, a first received positioning signal corresponding to the transmitted first positioning signal;
    receiving, at the receiver, a second received positioning signal corresponding to the transmitted second positioning signal;
    receiving, at the receiver, a third received positioning signal corresponding to the transmitted third positioning signal;
    receiving, at the receiver, the beacon signal;
    determining for the first, second and third received positioning signals a time point corresponding to the start of the common period defined by the first, second, and third received positioning signals, the time point corresponding to the start of the common period being determined based on the periodic beacon pulse of the received beacon signal; and
    determining a polarity of the first received positioning signal, a polarity of the second received positioning signal, and a polarity of the third received positioning signal based on properties of the first, second and third received positioning signals relative to the start of the common period and relative to properties of the first, second and third transmitted positioning signals.

2. The method of claim 1, further comprising determining a signed position along each of at least two of a first axis, a second axis, and a third axis of a receiver based on the determined polarities of the first, second, and third received positioning signals.

3. The method of claim 2, wherein the first direction is aligned with the first axis, the second direction is aligned with the second axis and the third direction is aligned with the third axis; and
 wherein the first direction, the second direction and the third direction are mutually orthogonal.

4. The method of claim 2, further comprising determining an uniquely associated orientation of the receiver based on the determined polarities of the first, second, and third received positioning signals.

5. The method of claim 1, wherein the polarities of the first, second, and third received positioning signals are determined based on the phases of the first, second, and third received positioning signals relative to the start of the common period.

6. The method of claim 1, wherein the polarities of the first, second, and third received positioning signals are determined independently of the time of flight elapsed between the transmission of the first, second and third transmitted positioning signals from the transmitter and the receiving of the first, second and third received positioning signals at the receiver.

7. The method of claim 1, wherein the polarities of the first, second, and third received positioning signals are determined based on relative phase information contained in the received positioning signals.

8. The method of claim 1, wherein the beacon signal is a radio frequency signal transmitted independently of the transmission of the first, second, and third transmitted positioning signals; and wherein the periodic beacon pulse has a bandwidth having an upper band limit being significantly higher than a frequency of any one of the first, second, and third transmitted positioning signals.

9. The method of claim 1, wherein the beacon signal is embedded in the first, second, and third transmitted positioning signals; and
 wherein each of the first, second and third transmitted positioning signals are modulated for a short interval of time at the start of each common period to provide the periodic beacon pulse.

10. The method of claim 1, wherein a subset of two of the first, second and third transmitted positioning signals have a uniquely identifiable signal pattern at each mutual zero-crossing of the first, second and third transmitted positioning signals;
 wherein determining the time point corresponding to the start of the common period defined by the first, second, and third received positioning signals comprises determining a mutual zero-crossing of the first, second, and third received positioning signals;
 wherein determining the polarity of the received positioning signals corresponding to the subset of the two transmitted positioning signals comprises comparing the pattern of said received positioning signals to the uniquely identifiable signal pattern of the subset of the two transmitted positioning signals; and
 wherein the polarity of the other of the received positioning signals is determined based on the polarities of the two received positioning signals in relation to relative orientations of the subset of the two transmitted positioning signals.

11. The method of claim 1, wherein determining the time point corresponding to the start of the common period defined by the first, second and third received positioning signals comprises determining a given time point in which the first, second, and third received positioning signals each have zero crossings occurring within a predetermined temporal distance of one another and within a predetermined temporal distance of the periodic beacon pulse.

12. The method of claim 1, wherein the first transmitted positioning signal, the second transmitted positioning signal, and the third transmitted positioning signal define an ordered sequence of phase patterns being repeated in time, each pattern lasting for a respective sub-period being a multiple of the periods of the first, second, and third positioning signals and the sub-periods of the ordered sequence forming the common period, the start of each sub-period being defined by a change in phase in at least one of the first, second, and third transmitted signals, the changes in phase at the start of each sub-period further defining an ordered sequence of phase change patterns, each phase change pattern being distinguishable from any other phase change pattern of the sequence;
 wherein determining the start of the common period comprises detecting a phase change in at least one of the first, second, and third received positioning signals corresponding to the start of a given common sub-period and determining the position of the start of the given common sub-period within the sequence of phase change patterns based on a comparison of the phase change pattern defined by the received positioning signals at the start of the given common sub-period relative to the sequence of phase change patterns of the transmitted signals; and
 wherein determining the polarity of the first, second and third received positioning signal comprises comparing the phase patterns of the first, second, and third received positioning signals against the sequence of phase patterns of the transmitted positioning signals.

13. The method of claim 1, wherein the time point corresponding to the start of the common period is further determined independently of any one of the first, second and third received positioning signals.

14. A positioning system comprising:
 a transmitter configured for:
  transmitting a first transmitted positioning signal having a first frequency and phase in a first direction;
  transmitting a second transmitted positioning signal having a second frequency and phase in a second direction, the second frequency being different from the first frequency; and
  transmitting a third transmitted positioning signal having a third frequency and phase in a third direction, the third frequency being different from the first frequency and the second frequency, the first positioning signal, the second positioning signal and the third positioning signal defining a common period being a common multiple of the periods of the first, second, and third positioning signals;
  transmitting a beacon signal having a periodic beacon pulse corresponding to the start of every common period defined by the first, second and third transmitted positioning signals; and
 a receiver configured for:

receiving a first received positioning signal corresponding to the transmitted first positioning signal, receiving a second received positioning signal corresponding to the transmitted second positioning signal, and receiving a third received positioning signal corresponding to the transmitted third positioning signal;

receiving the beacon signal;

determining for the first, second and third received positioning signals a time point corresponding to the start of the common period defined by the first, second, and third received positioning signals, the time point corresponding to the start of the common period being determined based on the periodic beacon pulse of the received beacon signal; and determining a polarity of the first received positioning signal, a polarity of the second received positioning signal, and a polarity of the third received positioning signal based on properties of the first, second and third received positioning signals relative to the start of the common period and relative to properties of the first, second and third transmitted positioning signals.

15. The positioning system of claim 14, wherein the receiver is further configured for determining a signed position of the receiver along each of at least two of a first axis, a second axis, and a third axis based on the determined polarities of the first, second, and third received positioning signals.

16. The positioning system of claim 15, wherein the first direction is aligned with the first axis, the second direction is aligned with the second axis and the third direction is aligned with the third axis; and wherein the first direction, the second direction and the third direction are mutually orthogonal.

17. The positioning system of claim 15, wherein the receiver is further configured for determining an uniquely associated orientation of the receiver based on the determined polarities of the first, second, and third received positioning signals.

18. The positioning system of claim 14, wherein the polarities of the first, second, and third received positioning signals are determined based on the phases of the first, second, and third received positioning signals relative to the start of the common period.

19. The positioning system of claim 14, wherein the polarities of the first, second, and third received positioning signals are determined independently of the time of flight elapsed between the transmission of the first, second and third transmitted positioning signals from the transmitter and the receiving of the first, second and third received positioning signals at the receiver.

20. The positioning system of claim 14, wherein the polarities of the first, second, and third received positioning signals are determined based on relative phase information contained in the received positioning signals.

21. The positioning system of claim 14, wherein the beacon signal is a radio frequency signal transmitted independently of the transmission of the first, second, and third transmitted positioning signals; and wherein the periodic beacon pulse has a bandwidth having an upper band limit being significantly higher than a frequency of any one of the first, second, and third transmitted positioning signals.

22. The positioning system of claim 14, wherein the beacon signal is embedded in the first, second, and third transmitted positioning signals; and wherein each of the first, second and third transmitted positioning signals are modulated for a short interval of time at the start of each common period to provide the periodic beacon pulse.

23. The positioning system of claim 14, wherein a subset of two of the first, second and third transmitted positioning signals have a uniquely identifiable signal pattern at each mutual zero-crossing of the first, second and third transmitted positioning signals;

wherein determining the time point corresponding to the start of the common period defined by the first, second, and third received positioning signals comprises determining a mutual zero-crossing of the first, second, and third received positioning signals;

wherein determining the polarity of the received positioning signals corresponding to the subset of the two transmitted positioning signals comprises comparing the pattern of said received positioning signals to the uniquely identifiable signal pattern of the subset of the two transmitted positioning signals; and wherein the polarity of the other of the received positioning signals is determined based on the polarities of the two received positioning signals in relation to relative orientations of the subset of the two transmitted positioning signals.

24. The positioning system of claim 14, wherein determining the time point corresponding to the start of the common period defined by the first, second and third received positioning signals comprises determining a given time point in which the first, second, and third received positioning signals each have zero crossings occurring within a predetermined temporal distance of one another and within a predetermined temporal distance of the periodic beacon pulse.

25. The positioning system of claim 14, wherein the first transmitted positioning signal, the second transmitted positioning signal, and the third transmitted positioning signal define an ordered sequence of phase patterns being repeated in time, each pattern lasting for a respective sub-period being a multiple of the periods of the first, second, and third positioning signals and the sub-periods of the ordered sequence forming the common period, the start of each sub-period being defined by a change in phase in at least one of the first, second, and third transmitted signals, the changes in phase at the start of each sub-period further defining an ordered sequence of phase change patterns, each phase change pattern being distinguishable from any other phase change pattern of the sequence;

wherein determining the start of the common period comprises detecting a phase change in at least one of the first, second, and third received positioning signals corresponding to the start of a given common sub-period and determining the position of the start of the given common sub-period within the sequence of phase change patterns based on a comparison of the phase change pattern defined by the received positioning signals at the start of the given common sub-period relative to the sequence of phase change patterns of the transmitted signals; and wherein determining the polarity of the first, second and third received positioning signal comprises comparing the phase patterns of the first, second, and third received positioning signals against the sequence of phase patterns of the transmitted positioning signals.

26. The positioning system of claim 14, wherein the time point corresponding to the start of the common period is further determined independently of any one of the first, second and third received positioning signals.

\* \* \* \* \*